(12) United States Patent
Choi et al.

(10) Patent No.: US 12,510,921 B2
(45) Date of Patent: Dec. 30, 2025

(54) INTEGRATED CIRCUIT DEVICES HAVING ENHANCED CLOCK GENERATORS THEREIN

(71) Applicant: SAMSUNG ELECTRONICS CO., LTD., Suwon-si (KR)

(72) Inventors: Jaehyouk Choi, Daejeon (KR); Yuhwan Shin, Daejeon (KR); Juyeop Kim, Daejeon (KR); Yongwoo Jo, Daejeon (KR)

(73) Assignees: Samsung Electronics Co., Ltd., Suwon-si (KR); Korea Advanced Institute Science and Technology, Daejeon (KR)

( * ) Notice: Subject to any disclaimer, the term of this patent is extended or adjusted under 35 U.S.C. 154(b) by 97 days.

(21) Appl. No.: 18/347,920

(22) Filed: Jul. 6, 2023

(65) Prior Publication Data

US 2024/0219953 A1    Jul. 4, 2024

(30) Foreign Application Priority Data

Dec. 28, 2022    (KR) .................. 10-2022-0186648

(51) Int. Cl.
*G06F 1/08*    (2006.01)
*G06F 1/04*    (2006.01)
(Continued)

(52) U.S. Cl.
CPC ............. *G06F 1/08* (2013.01); *G06F 1/06* (2013.01); *G06F 1/04* (2013.01); *G06F 1/12* (2013.01)

(58) Field of Classification Search
CPC ..... G06F 1/12; G06F 1/08; G06F 1/04; G06F 1/06
(Continued)

(56) References Cited

U.S. PATENT DOCUMENTS

| | | |
|---|---|---|
| 7,956,664 B2 | 6/2011 | Chueh et al. |
| 8,253,466 B2 | 8/2012 | Jeffries et al. |
| | (Continued) | |

FOREIGN PATENT DOCUMENTS

| | | |
|---|---|---|
| CN | 107690751 A | 2/2018 |
| CN | 112994686 A | 6/2021 |
| | (Continued) | |

OTHER PUBLICATIONS

Chae et al. "A Quadrature Clock Corrector for DRAM Interfaces, With a Duty-Cycle and Quadrature Phase Detector Based on a Relaxation Oscillator" IEEE Transactions on Very Large Scale Integration (VLSI) Systems 27(4):978-982 (Apr. 2019).
(Continued)

*Primary Examiner* — Ji H Bae
(74) *Attorney, Agent, or Firm* — Wolf, Greenfield & Sacks, P.C.

(57) ABSTRACT

A clock generator includes a phase controller configured to generate phase control information in response to comparing a phase of an input clock signal against a phase of a division clock signal, and an oscillator configured to generate a plurality of oscillation signals at an equivalent output frequency but different phases, in response to the phase control information and duty control information. A duty cycle converter is provided, which is configured to generate a plurality of output clock signals at the output frequency by adjusting duty cycles of the plurality of oscillation signals, such that the plurality of output clock signals have duty cycles smaller than the duty cycles of the plurality of oscillation signals. A clock divider is provided, which is configured to generate the division clock signal by dividing the output frequency of one of the plurality of output clock signals, such that the division clock signal has a division frequency smaller than the output frequency. A duty cycle
(Continued)

calibrator is provided, which is configured to generate the duty control information for adjusting a duty cycle difference of the plurality of output clock signals, in response to detecting duty cycle differences between the plurality of output clock signals.

15 Claims, 27 Drawing Sheets

(51) Int. Cl.
    *G06F 1/06* (2006.01)
    *G06F 1/12* (2006.01)

(58) Field of Classification Search
    USPC .......................................... 713/400, 500, 503
    See application file for complete search history.

(56) References Cited

U.S. PATENT DOCUMENTS

| | | | |
|---|---|---|---|
| 10,103,738 B2 | 10/2018 | Ek et al. | |
| 10,963,002 B1* | 3/2021 | Hafizi | G06F 1/10 |
| 11,196,534 B1 | 12/2021 | Parvizi et al. | |
| 11,290,095 B1* | 3/2022 | Patel | H03K 5/05 |
| 2007/0046346 A1* | 3/2007 | Minzoni | H03L 7/087 |
| | | | 327/158 |
| 2008/0054947 A1* | 3/2008 | Choi | H03L 7/0812 |
| | | | 327/12 |
| 2012/0161827 A1 | 6/2012 | Madeira et al. | |
| 2018/0175844 A1* | 6/2018 | Jeong | H03K 5/1565 |
| 2019/0181847 A1* | 6/2019 | Satoh | G11C 7/12 |
| 2022/0171425 A1 | 6/2022 | Parvizi et al. | |
| 2022/0294429 A1 | 9/2022 | Coban | |
| 2022/0302905 A1* | 9/2022 | Zhang | H03K 5/1565 |
| 2023/0136561 A1* | 5/2023 | Boujamaa | G06F 1/08 |
| | | | 375/376 |

FOREIGN PATENT DOCUMENTS

| | | |
|---|---|---|
| CN | 113364457 A | 9/2021 |
| WO | 2022119909 A1 | 6/2022 |

OTHER PUBLICATIONS

Kim et al. "A 2.3-mW 0.01-mm2 1.25-GHz Quadrature Signal Corrector With 1.1-ps Error for Mobile DRAM Interface in 65-nm CMOS" IEEE Transactions on Circuits and Systems—II: Express Briefs 64(4):397-401 (Apr. 2017).

Park et al. "A 1.3-4-GHz Quadrature-Phase Digital DLL Using Sequential Delay Control and Reconfigurable Delay Line" IEEE Journal of Solid-State Circuits 56(6):1886-1896 (Jun. 2021).

Shin et al. "A 0.8-to-2.3GHz Quadrature Error Corrector with Correctable Error Range of 101.6ps Using Minimum Total Delay Tracking and Asynchronous Calibration On-Off Scheme for DRAM Interface" ISSCC 2020 (Feb. 2020).

Yoon et al. "A 3.2-12.8Gb/s Duty-Cycle Compensating Quadrature Error Corrector for DRAM Interfaces, With Fast Locking and Low Power Characteristics" IEEE 47th European Solid State Circuits Conference (ESSCIRC) (pp. 463-466) (Sep. 2021).

\* cited by examiner

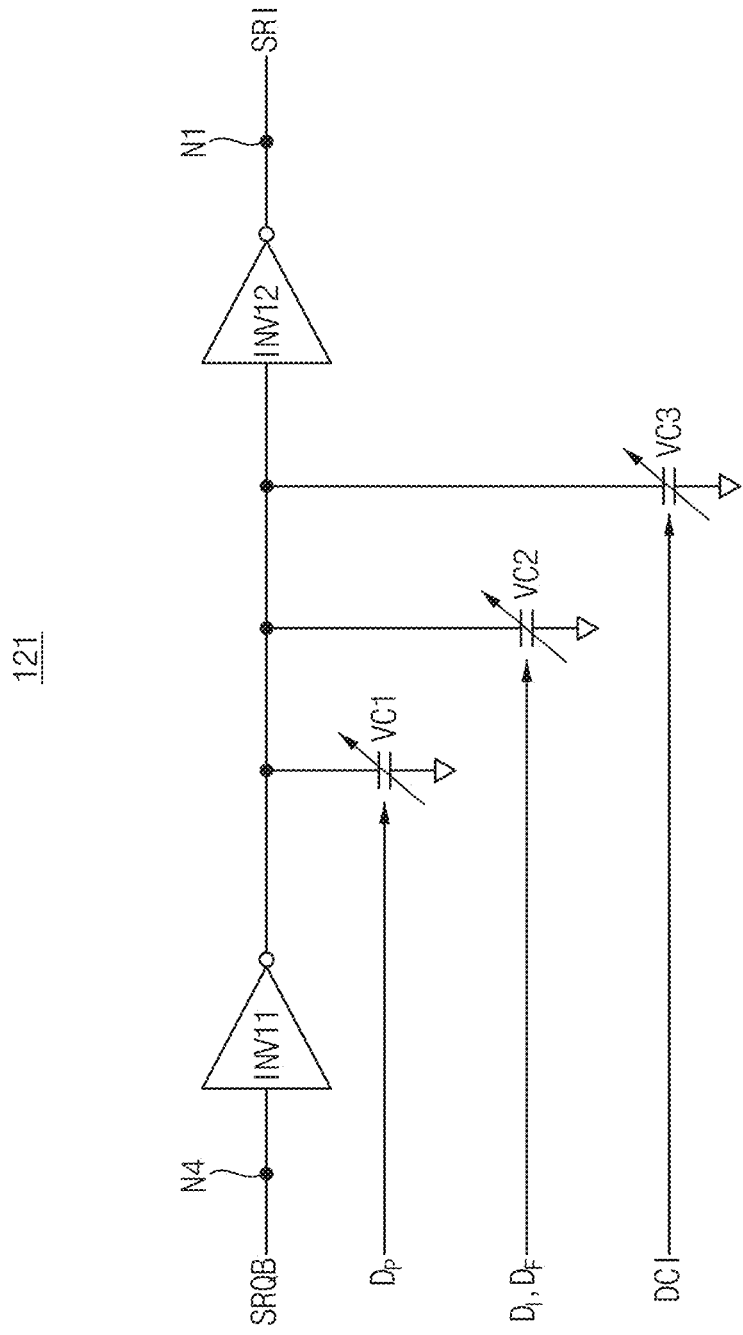

FIG. 9

| | PCAL1 | PCAL2 | PCAL3 | PCAL1 | |
|---|---|---|---|---|---|
| SEL[1:0] | 00 | 10 | 11 | 00 | ... |
| SMX1 | SOI | SOIB | SOIB | SOI | ... |
| SMX2 | SOQ | SOQ | SOQB | SOQ | ... |
| CMP ⟹ | DCQ | DCIB | DCQB | DCQ | ... |

(INCREASE DCQ)

INTEGRATED CIRCUIT DEVICES HAVING ENHANCED CLOCK GENERATORS THEREIN

REFERENCE TO PRIORITY APPLICATION

This U.S. non-provisional application claims priority under 35 USC § 119 to Korean Patent Application No. 10-2022-0186648, filed Dec. 28, 2022, the disclosure of which is hereby incorporated herein by reference.

BACKGROUND

Example embodiments relate generally to integrated circuit devices and, more particularly, to clock signal generators and integrated circuit memory devices including clock signal generators.

In an integrated circuit memory device, such as a double data rate (DDR) synchronous dynamic random access memory (SDRAM), a delay-locked loop (DLL) can be used to synchronize a data strobe pin and a data pin that are located at a distance from a position receiving an external clock signal. The DLL may transmit quadrature signals (I, Q, IB, QB signals) having the same frequency as the external clock signal through several data pins (e.g., 8 or 16 data pins). In this case, a delay of several ns (nano seconds) may occur because the high-frequency quadrature are transmitted to the distant data pins, and the amount of power consumed in the clock distribution network (CDM) may increase. In addition, since the quadrature signals are transmitted to the data pins far away through the CDN, quadrature errors of the quadrature signals are easily deteriorated immediately before the data pins.

To solve this quadrature error problem, a quadrature error corrector (QEC) may be used in the front of the data pin or in an interface using the quadrature signals. However, existing QECs do not have filtering effect of input signal noise because they are based on the DLL, and power consumption is high because they operate at the frequency of input signals. In addition, because it operates based on a digital-to-time converter (DTC), the frequency range of the input signal is limited, and an additional 25% duty cycle converter is typically required to transmit data at a quadrature rate from the transmitter driving the data pin.

SUMMARY

Some example embodiments may provide a clock generator capable of efficiently generating output clock signals.

Some example embodiments may provide a semiconductor memory device adopting clock distribution network capable of efficiently providing the output clock signals to interface circuits using the clock generator.

According to example embodiments, a clock generator includes a phase controller, an oscillator, a duty cycle converter, a clock divider and a duty cycle calibrator. The phase controller generates phase control information by comparing phases of an input clock signal and a division clock signal. The oscillator generates a plurality of oscillation signals based on the phase control information and duty control information such that the plurality of oscillation signals have an equivalent output frequency, but different phases relative to each other. The duty cycle converter generates a plurality of output clock signals by converting duty cycles of the plurality of oscillation signals such that the plurality of output clock signals have the output frequency and duty cycles smaller than the duty cycles of the plurality of oscillation signals. The clock divider generates the division clock signal by dividing the output frequency of one output clock signal from among the plurality of output clock signals such that the division clock signal has a division frequency smaller than the output frequency. The duty cycle calibrator generates the duty control information to adjust a duty cycle difference of the plurality of output clock signals by detecting the duty cycle difference of the plurality of output clock signals.

According to example embodiments, a semiconductor memory device includes a plurality of data pins configured to exchange data with a memory controller, a delay-locked loop configured to generate a delayed clock signal by delaying a system clock signal, a global clock divider configured to generate an input clock signal by dividing a frequency of the delayed clock signal such that the input clock signal has a frequency smaller than a frequency of the system clock signal, a clock tree structure configured to transfer the input clock signal output from the global clock divider, a plurality of clock generators configured to receive the input clock signal through the clock tree structure and respectively generate a plurality of output clock signal based on the input clock signal, and a plurality of interface circuits configured to process the data exchanged through the plurality of data pins based on the plurality of output clock signals.

According to example embodiments, a clock generator includes a phase controller configured to generate phase control information by comparing phases of an input clock signal and a division clock signal, an oscillator configured to generate four oscillation signals based on the phase control information and duty control values such that the four oscillation signals have an output frequency and phase difference of 90 degrees, a duty cycle converter configured to generate four quadrature clock signals by converting duty cycles of the four oscillation signals such that the four quadrature clock signals have the output frequency and duty cycles of 25%, a clock divider configured to generate the division clock signal by dividing the output frequency of one quadrature clock signal from among the four quadrature clock signals such that the division clock signal has a division frequency smaller than the output frequency, and a duty cycle calibrator configured to generate the duty control values to adjust a duty cycle difference of the four quadrature clock signals by detecting the duty cycle difference of the four quadrature clock signals.

The clock generator according to example embodiments may filter noise of the input clock signal by the implementation based on a digital phase-locked loop, operate with low power by the operation in a state in which the frequency is lowered, and operate over a wide frequency range because it utilizes duty cycle comparison to correct quadrature errors. In addition, a semiconductor memory device adopting a clock distribution network using a clock generator according to example embodiments may operate with low power consumption by transferring the input clock signal having a reduced frequency through a clock tree structure and generating the plurality of output clock signals from the clock generators. In addition, the clock generators included in the clock distribution network of the semiconductor memory device may be disposed immediately before the interface circuits that use the plurality of output clock signals having a duty cycle of 25% to reduce the quadrature errors and additional delay cells for quadrature error correction may be omitted. Accordingly, the performance of the semiconductor memory device may be improved by sufficiently securing a data sampling window of the interface circuit while significantly reducing the power consumption of the clock distribution network.

BRIEF DESCRIPTION OF THE DRAWINGS

Example embodiments of the present disclosure will be more clearly understood from the following detailed description taken in conjunction with the accompanying drawings.

FIGS. 5A through 5D are diagrams illustrating an example embodiment of buffers included in the oscillator of FIG. 4.

FIGS. 9 through 12B are diagrams illustrating a calibration operation of the duty cycle calibrator of FIG. 7.

DETAILED DESCRIPTION OF THE EMBODIMENTS

Figure 1:
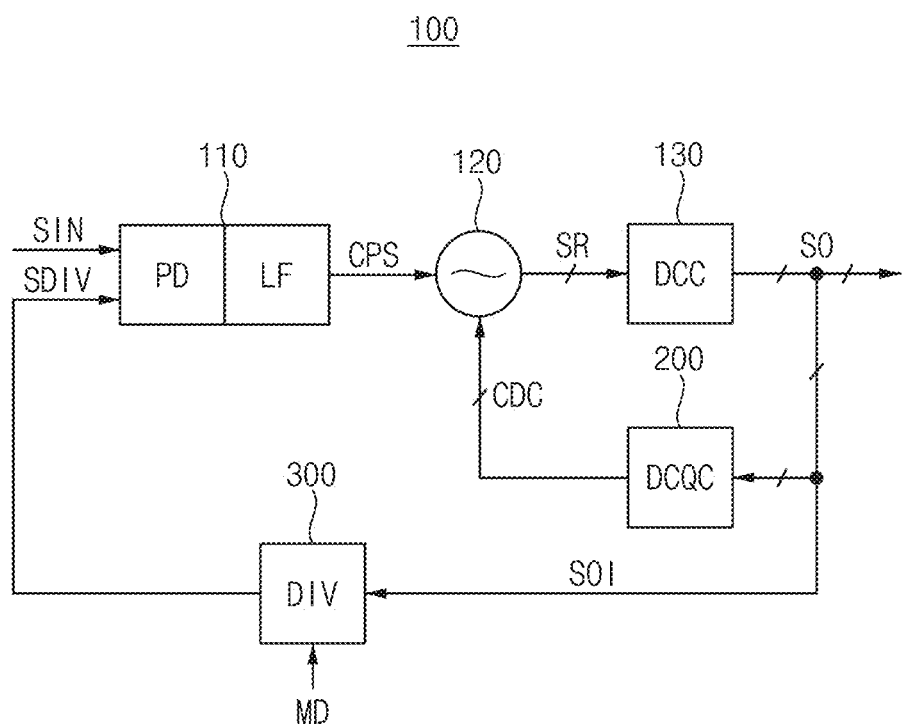
FIG. 1 is a block diagram illustrating a clock generator according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a clock generator 100 according to example embodiments, which includes a phase controller 110, an oscillator 120, a duty cycle converter DCC 130, a duty cycle calibrator DCQC and a clock divider DIV 300. In some embodiments, the phase controller 110 may generate phase control information CPS by comparing phases of an input clock signal SIN and a division clock signal SDIV. The phase controller 100 may include a phase detector PD and a loop filter LF. In some example embodiments, the phase detector PD may be implemented as a bang-bang phase detector, and the loop filter LF may be implemented as a digital loop filter. In other words, the clock generator 100 according to example embodiments may be implemented based on a digital phase-locked loop. Example embodiments of the phase controller 110 will be described below with reference to FIG. 3.

The oscillator 120 may generate a plurality of oscillation signals SR based on the phase control information CPS and duty control information CDC such that the plurality of oscillation signals SR may have an output frequency and different phases. In some example embodiments, the oscillator 120 may include a ring digitally-controlled oscillator (RDCO). The oscillator 120 may adjust transition time points of the plurality of oscillation signals SR based on the duty control information CDC such that the duty cycles of the plurality of output clock signals SO may become uniform. Example embodiments of the oscillator 120 will be described below with reference to FIG. 4.

The duty cycle converter 130 may generate the plurality of output clock signals SO by converting duty cycles of the plurality of oscillation signals SR such that the plurality of output clock signals SO have the output frequency and duty cycles smaller than the duty cycles of the plurality of oscillation signals SR. In some example embodiments, the duty cycles of the plurality of oscillation signals SR may be 50% and the duty cycles of the output clock signals SO may be 25%. Example embodiments of the duty cycle converter 130 will be described below with reference to FIG. 6.

The clock divider 300 may generate the division clock signal SDIV by dividing the output frequency of one output clock signal SOI from among the plurality of output clock signals SO such that the division clock signal SDIV may have a division frequency smaller than the output frequency. In some example embodiments, the clock divider 300 may selectively operate in an active mode or an idle mode based on a mode signal MD. The clock divider 300 may generate the division clock signal SDIV such that the division clock signal SDIV may have a first division frequency in the active mode and have a second division frequency smaller than the first division frequency in the idle mode. Example embodiments of the clock divider 300 will be described below with reference to FIG. 21.

The duty cycle calibrator 200 may generate the duty control information CDC to adjust a duty cycle difference of the plurality of output clock signals SO by detecting the duty cycle difference of the plurality of output clock signals SO. In some example embodiments, the duty cycle calibrator 200 may convert the duty cycles of the plurality of output clock signals SO to direct current (DC) voltages and generate the duty control information CDC by comparing the DC voltages. Example embodiments of the duty cycle calibrator 200 will be described below with reference to FIG. 7.

Hereinafter, example embodiments will be described focusing on a case in which the clock generator 100 generates four quadrature clock signals having a phase difference of 90 degrees and a duty cycle of 25% as a plurality of output clock signals SO. Example embodiments are not limited thereto and may be applied to generate any number of output clock signals SO. For example, when the number of output clock signals SO is k (where k is a natural number greater than or equal to 2), the output clock signals SO have a phase difference of 360/k degrees and a duty cycle of 100/k %.

Figure 2:
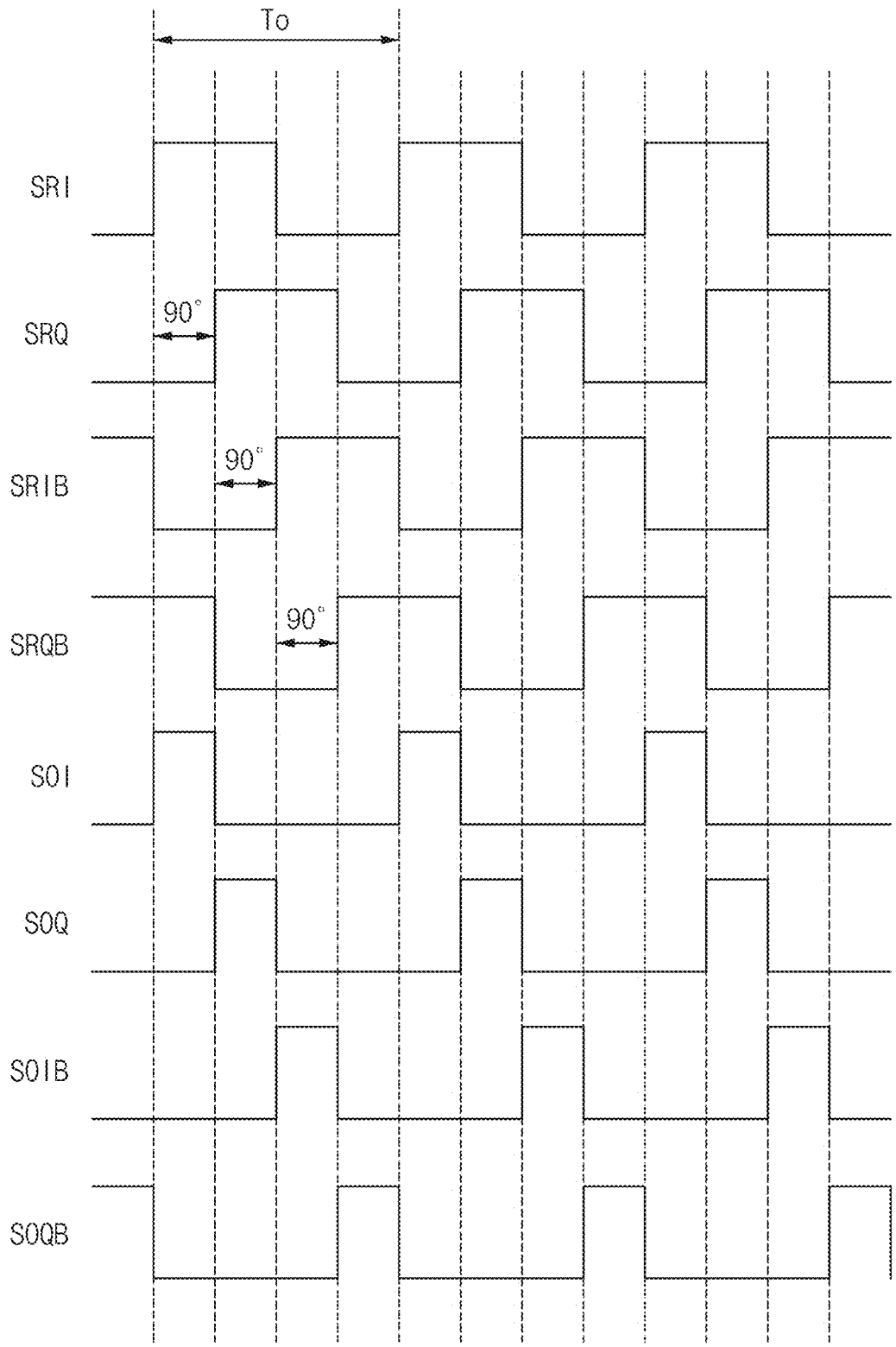
FIG. 2 is a timing diagram illustrating an example embodiment of a plurality of oscillation signals and a plurality of output clock signals generated by the clock generator of FIG. 1.

FIG. 2 is a timing diagram illustrating an example embodiment of a plurality of oscillation signals and a plurality of output clock signals generated by the clock generator of FIG. 1. Referring to FIG. 2, the plurality of oscillation signals SR may include a first oscillation signal SRI, a second oscillation signal SRQ, a third oscillation signal SRIB, and a fourth oscillation signal SRQB, and the plurality of output clock signals SO may include a first quadrature clock signal SOI, a second quadrature clock signal SOQ, a third quadrature clock signal SOIB, and a fourth quadrature clock signal SOQB.

Thus, for example, the first quadrature clock signal SOI may correspond to one output clock signal provided to the clock divider 300 of FIG. 1. The first quadrature clock signal SOI, the second quadrature clock signal SOQ, the third quadrature clock signal SOIB, and the fourth quadrature clock signal SOQB may have relative phase differences of 90 degrees. In other words, the second quadrature clock signal SOQ may be 90 degrees delayed relative to the first quadrature clock signal SOI, the third quadrature clock signal SOIB may be 90 degrees delayed relative to the second quadrature clock signal SOQ, and the fourth quadrature clock signal SOQB may be 90 degrees delayed relative to the third quadrature clock signal SOIB.

The first oscillation signal SRI may have the same phase as the first quadrature clock signal SOI, the second oscillation signal SRQ may have the same phase as the second quadrature clock signal SOQ, the third oscillation signal SRIB may have the same phase as the third quadrature clock signal SOIB, and the fourth oscillation signal SRQB may have the same phase as the fourth quadrature clock signal SOQB.

As illustrated in FIG. 2, the duty cycle of the first oscillation signal SRI, the second oscillation signal SRQ, the third oscillation signal SRIB, and the fourth oscillation signal SRQB may be 50%, and the duty cycle of the first quadrature clock signal SOI, the second quadrature clock signal SOQ, the third quadrature clock signal SOIB, and the fourth quadrature clock signal SOQB may be 25%. The duty cycle represents the ratio of the pulse width to the pulse period of the clock signal, and may also be referred to as a duty ratio.

Figure 3:
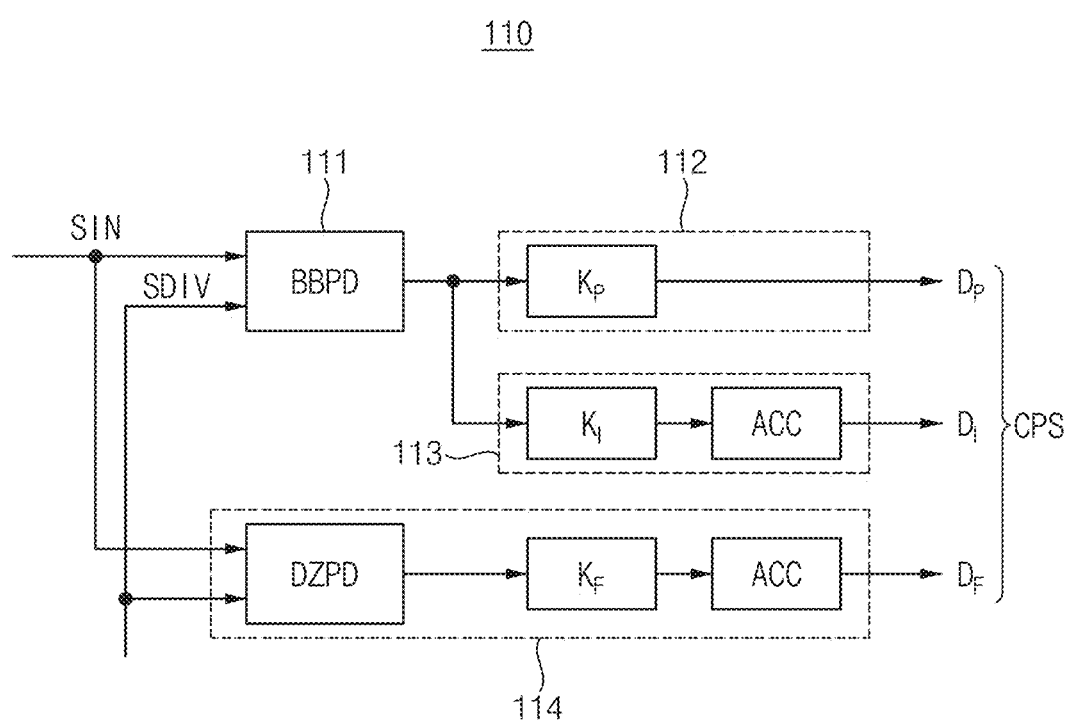
FIG. 3 is a diagram illustrating an example embodiment of a phase controller included in the clock generator of FIG. 1.

FIG. 3 is a diagram illustrating an example embodiment of a phase controller 110 included in the clock generator of FIG. 1, which is shown as including a bang-bang phase detector (BBPD) 111 and one or more digital loop filters 112, 123 and 124. The digital loop filters 112, 113 and 114 may basically include a proportional path 112, and may further include an integral path 113 and/or a frequency-acquisition path 114. The proportional path 112 may be implemented with a filter having a gain $K_P$ and may filter an output of the bang-bang phase detector 111 to generate a first phase control value $D_P$.

The integration path 113 may be implemented with a filter and an integrator ACC with a gain $K_I$, and may filter and accumulate the output of the bang-bang phase detector 111 to generate a second phase control value $D_I$.

The frequency acquisition path 114 may be implemented with a dead-zone phase detector DZPD that compares the phases of the input clock signal SIN and the division clock signal SDIV, a filter with a gain $K_F$, and an integrator ACC. The frequency acquisition path 114 may generate a third phase control value $D_F$ by filtering and accumulating the output of the zone phase detector DZPD.

The phase control information CPS of FIG. 1 may include the first phase control value $D_P$, the second phase control value $D_I$, and/or the third phase control value $D_F$. In an example embodiment, each of the first phase control value $D_P$, the second phase control value $D_I$ and the third phase control value $D_F$ may be a digital value of 1 bit or more. The phase controller 110 of FIG. 1 may include the bang-bang phase detector 111 and digital loop filters 112, 113 and 114, such that the phase controller 110, the oscillator 120, the duty cycle converter 130 and the clock divider 300 may form a digital phase-locked loop. The clock generator 100 according to example embodiments may be implemented based on a digital phase-locked loop to generate the plurality of output clock signals SO by filtering noise of the input clock signal SIN.

Figure 4:
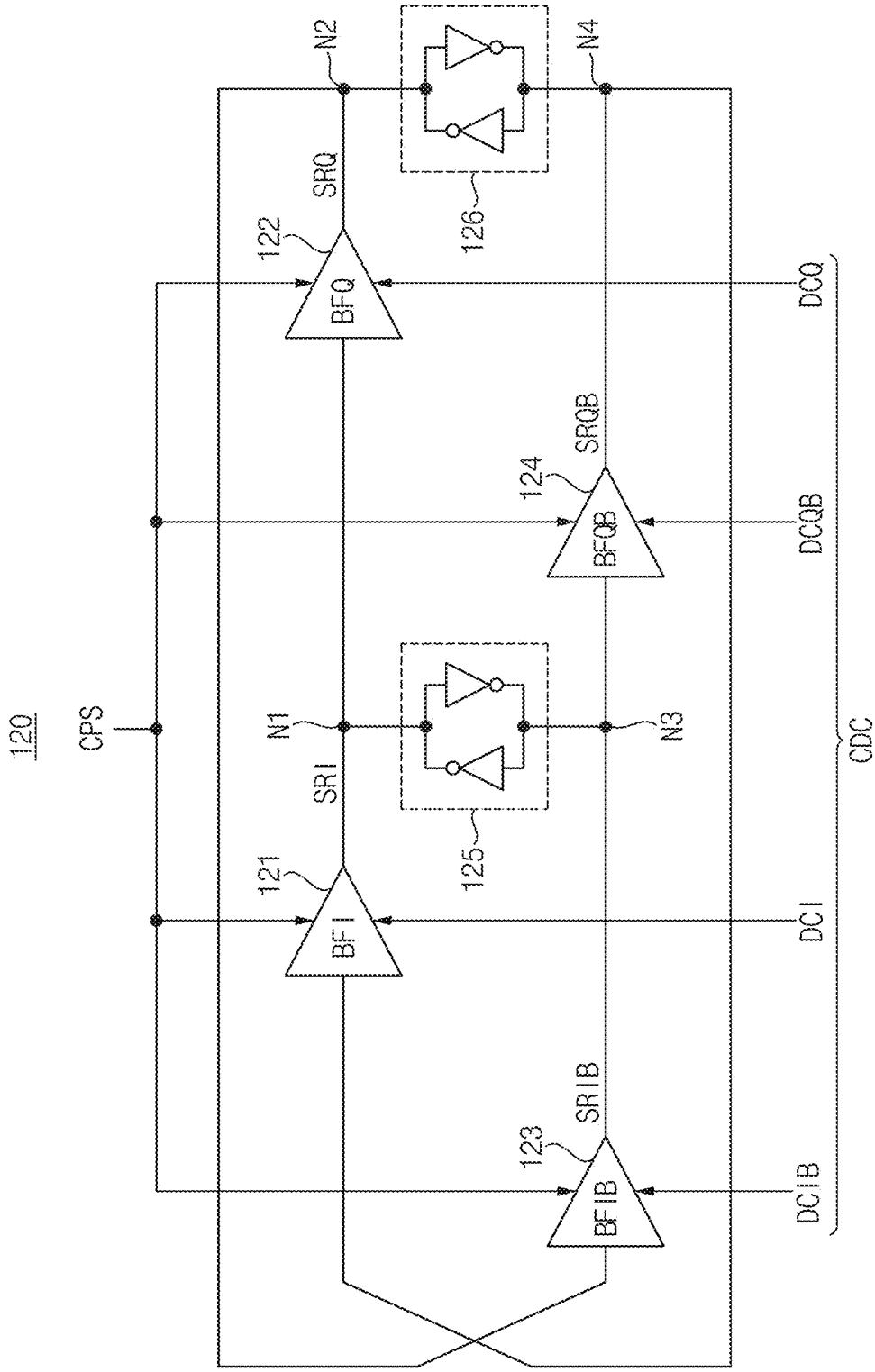
FIG. 4 is a diagram illustrating an example embodiment of an oscillator included in the clock generator of FIG. 1.

FIG. 4 is a diagram illustrating an example embodiment of an oscillator included in the clock generator of FIG. 1. Referring to FIG. 4, the oscillator 120 may include a first buffer BFI 121, a second buffer BFQ 122, a third buffer BFIB 123, and a fourth buffer BFQB 124. According to example embodiments, the oscillator 120 may further include a first latch 125 and a second latch 126.

The first buffer 121 may be connected between a fourth node N4 and a first node N1, and generate a first oscillation signal SRI through the first node N1 based on the phase control information CPS and the first duty control value DCI. The second buffer 122 may be connected between the first node N1 and a second node N2, and generate a second oscillation signal SRQ through the second node N2 based on the phase control information CPS and the second duty control value DCQ. The third buffer 123 may be connected between the second node N2 and a third node N3, and generate a third oscillation signal SRIB through the third node N3 based on the phase control information CPS and the third duty control value DCIB. The fourth buffer 124 may be connected between the third node N3 and the fourth node N4, and generate a fourth oscillation signal SRQB through the fourth node N4 based on the phase control information CPS and the fourth duty control value DCQB. The first latch 125 may include two inverters and may be connected between the first node N1 and the third node N3. The second latch 126 may include two inverters and may be connected between the second node N2 and the fourth node N4.

Figure 5B:
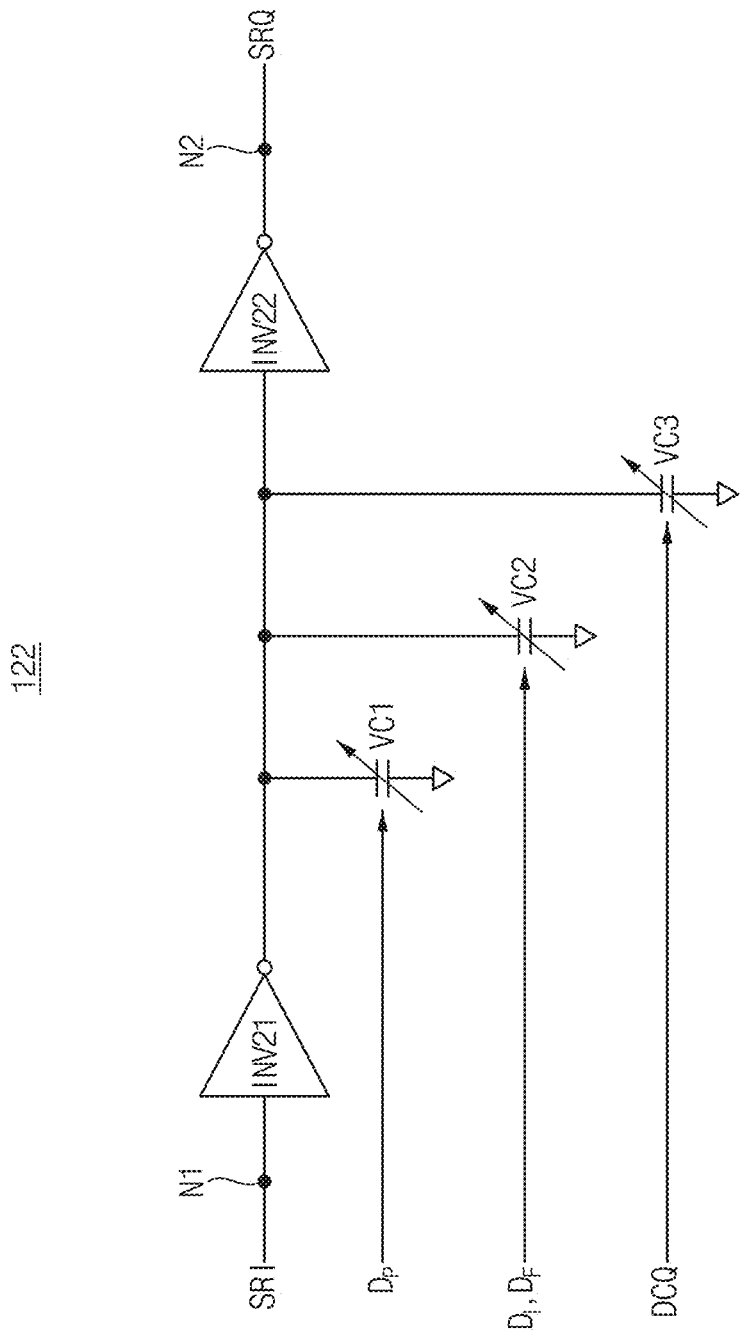

FIGS. 5A through 5D are diagrams illustrating an example embodiment of buffers included in the oscillator of FIG. 4. Referring to FIGS. 4 and 5A, the first buffer 121 may include a first inverter INV11, a second inverter INV12, and variable capacitors VC1, VC2 and VC3. The first inverter INV11 and the second inverter INV12 may be cascade-connected between the fourth node N4 and the first node N1, receive the fourth oscillation signal SRQB through the fourth node N4, and output the first oscillation signal SRI through the first node N1. The variable capacitors VC1, VC2 and VC3 may be connected between an output node of the first inverter INV11 (that is, an input node of the second inverter INV12) and the ground. The variable capacitors VC1 and VC2 may adjust the delay amount of the first buffer 121 based on the aforementioned phase control values $D_P$, $D_I$ and $D_F$. In addition, the variable capacitor VC3 may adjust the delay amount of the first buffer 121 based on the first duty control value DCI.

Referring to FIGS. 4 and 5B, the second buffer 122 may include a first inverter INV21, a second inverter INV22, and variable capacitors VC1, VC2 and VC3. The first inverter INV21 and the second inverter INV22 may be cascade-connected between the first node N1 and the second node N2, receive the first oscillation signal SRI through the first node N1, and output the second oscillation signal SRQ through the second node N2. The variable capacitors VC1, VC2 and VC3 may be connected between an output node of the first inverter INV21 (that is, an input node of the second inverter INV22) and the ground. The variable capacitors VC1 and VC2 may adjust the delay amount of the second buffer 122 based on the aforementioned phase control values $D_P$, $D_I$ and $D_F$. In addition, the variable capacitor VC3 may adjust the delay amount of the second buffer 122 based on the second duty control value DCQ.

Figure 5C:
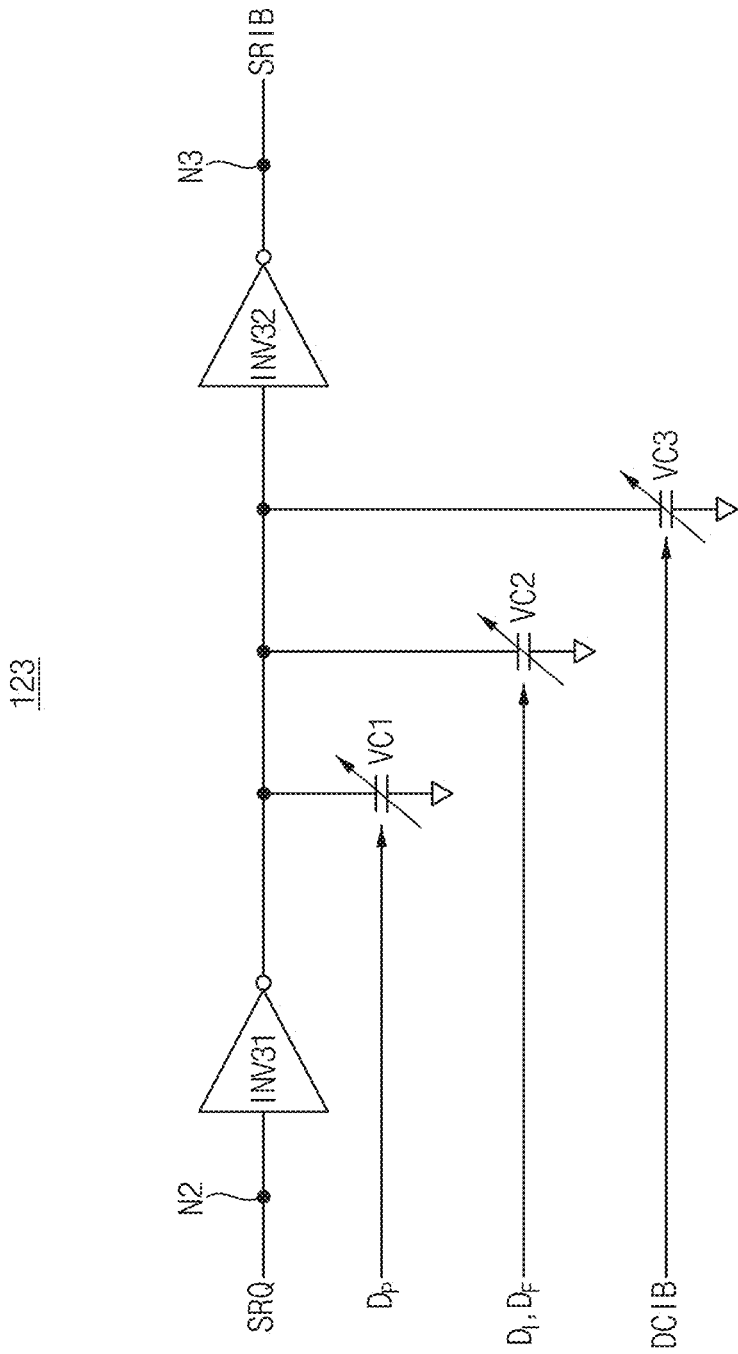

Referring to FIGS. 4 and 5C, the third buffer 123 may include a first inverter INV31, a second inverter INV32, and variable capacitors VC1, VC2 and VC3. The first inverter INV31 and the second inverter INV32 may be cascade-connected between the second node N2 and the third node N3, receive the second oscillation signal SRQ through the second node N2, and output the third oscillation signal SRIB through the third node N3. The variable capacitors VC1, VC2 and VC3 may be connected between an output node of the first inverter INV31 (that is, an input node of the second inverter INV32) and the ground. The variable capacitors VC1 and VC2 may adjust the delay amount of the third buffer 123 based on the aforementioned phase control values $D_P$, $D_I$ and $D_F$. In addition, the variable capacitor VC3 may adjust the delay amount of the third buffer 123 based on the third duty control value DCIB.

Figure 5D:
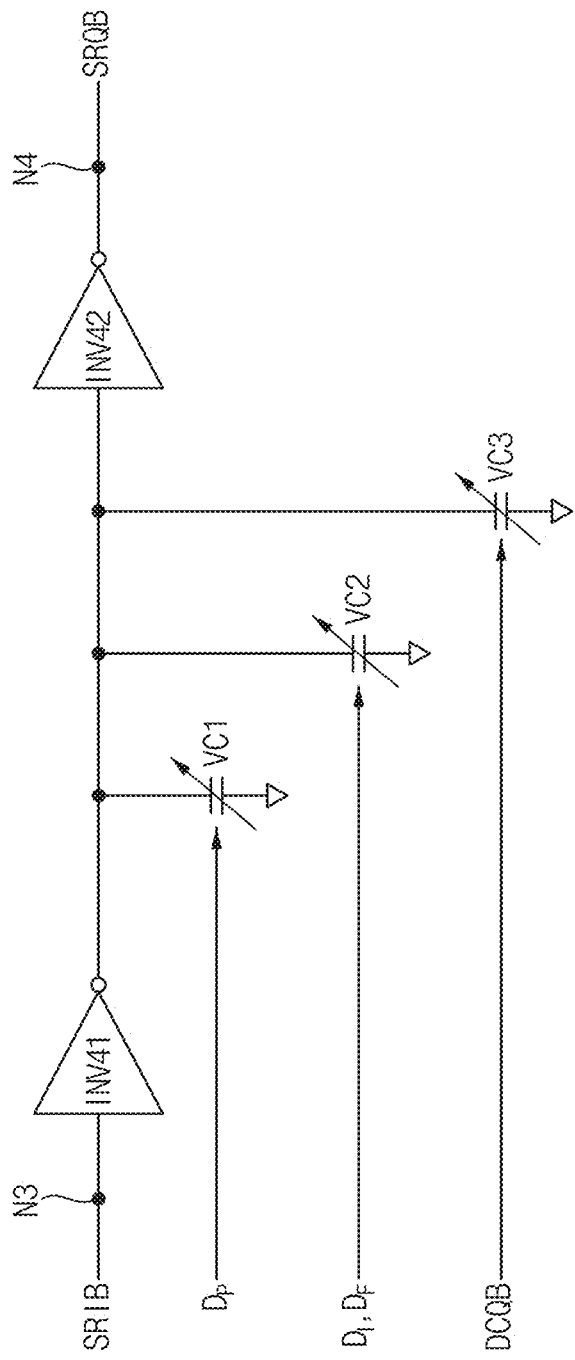

Referring to FIGS. 4 and 5D, the fourth buffer 124 may include a first inverter INV41, a second inverter INV42, and variable capacitors VC1, VC2 and VC3. The first inverter INV41 and the second inverter INV42 may be cascade-connected between the third node N3 and the fourth node N4, receive the third oscillation signal SRIB through the third node N3, and output the fourth oscillation signal SRQB through the fourth node N4. The variable capacitors VC1, VC2 and VC3 may be connected between an output node of the first inverter INV41 (that is, an input node of the second inverter INV42) and the ground. The variable capacitors VC1 and VC2 may adjust the delay amount of the fourth buffer 124 based on the aforementioned phase control values DP, DI and DF. In addition, the variable capacitor VC3 may adjust the delay amount of the fourth buffer 124 based on the fourth duty control value DCQB.

As described with reference to FIGS. 4 through 5D, the first buffer 121, the second buffer 122, the third buffer 123 and the fourth buffer 124 may commonly receive the phase control information CPS as described with reference to FIG. 3. The first buffer 121, the second buffer 122, the third buffer 123 and the fourth buffer 124 may adjust the respective delay amounts based on the phase control information CPS such that the first quadrature clock signal SOI corresponding to the first oscillation signal SRI may be synchronized with the phase of the input clock signal SIN.

Meanwhile, the first buffer 121, the second buffer 122, the third buffer 123 and the fourth buffer 124 may respectively receive the first duty control value DCI, the second duty control value DCQ, the third duty control value DCIB and the fourth duty control value DCQB. The first buffer 121, the second buffer 122, the third buffer 123 and the fourth buffer 124 may independently control the phases of the first oscillation signal SRI, the second oscillation signal SRQ, the third oscillation signal SRIB and the fourth oscillation signal SRQB based on the respective duty control values such that the duty cycles of the first quadrature clock signal SOI, the second quadrature clock signal SOQ, the third quadrature clock signal SOIB and the fourth quadrature clock signal SOQB may become uniform.

Figure 6:
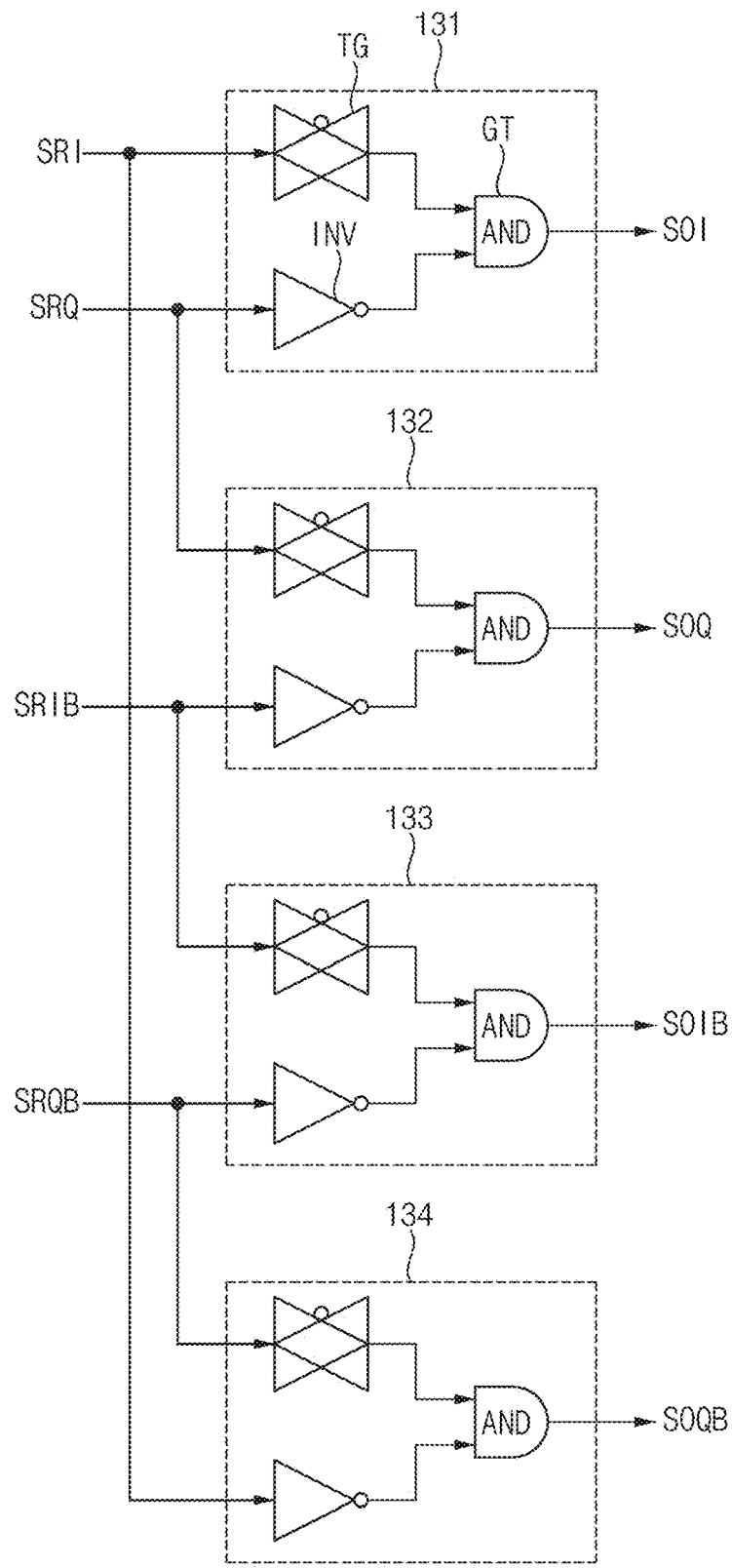
FIG. 6 is a diagram illustrating an example embodiment of a duty cycle converter included in the clock generator of FIG. 1.

FIG. 6 is a diagram illustrating an example embodiment of a duty cycle converter included in the clock generator of FIG. 1. Referring to FIG. 6, the duty cycle converter 130 may include a first converter 131, a second converter 132, a third converter 133 and a fourth converter 134. Each of the first converter 131, the second converter 132, the third converter 133, and the fourth converter 134 may include a transfer gate TG, an inverter INV, and a logic gate GT. The logic gate GT may be implemented as an AND gate. The transfer gate TG may have the same delay as the inverter INV.

The first converter 131 may generate the first quadrature clock signal SOI having a duty cycle of 25% by performing an AND operation on the first oscillation signal SRI and an inverted signal of the second oscillation signal SRQ. The second converter 132 may generate the second quadrature clock signal SOQ having a duty cycle of 25% by performing an AND operation on the second oscillation signal SRQ and an inverted signal of the third oscillation signal SRIB. The third converter 133 may generate the third quadrature clock signal SOIB having a duty cycle of 25% by performing an AND operation on the third oscillation signal SRIB and an inverted signal of the fourth oscillation signal SRQB. The fourth converter 134 may generate the fourth quadrature clock signal SOQB having a duty cycle of 25% by performing an AND operation on the fourth oscillation signal SRQB and an inverted signal of the first oscillation signal SRI.

As a result, the duty cycle converter 130 may perform logical operations on the first oscillation signal SRI, the second oscillation signal SRQ, the third oscillation signal SRIB and the fourth oscillation signal SRQB having the phase difference of 90 degrees and the duty cycle of 50% to generate the first quadrature clock signal SOI, the second quadrature clock signal SOQ, the third quadrature clock signal SOIB and the fourth quadrature clock signal SOQB having the phase difference of 90 degrees and the duty cycle of 25%.

Figure 7:
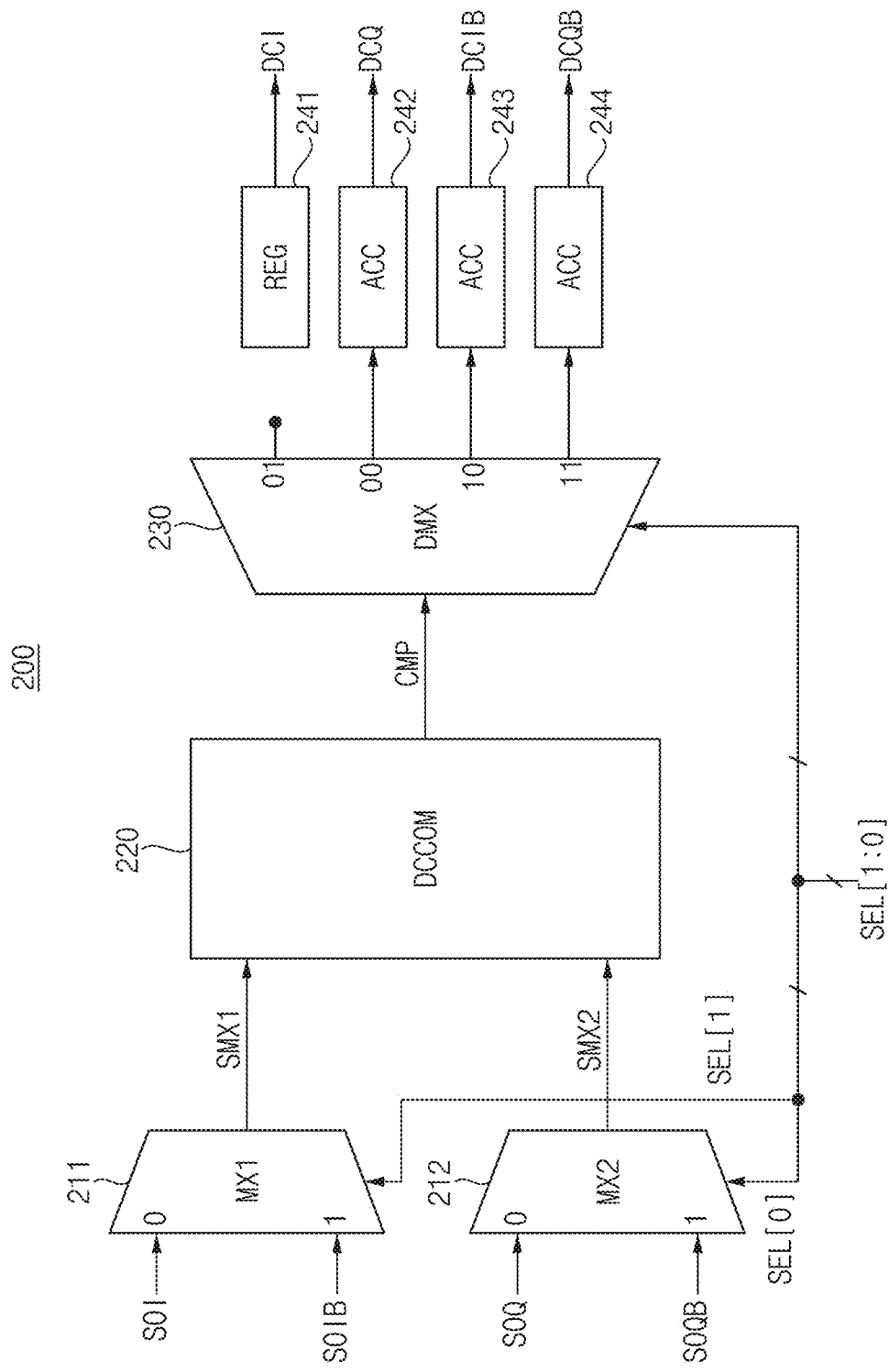
FIG. 7 is a diagram illustrating an example embodiment of a duty cycle calibrator included in the clock generator of FIG. 1.

FIG. 7 is a diagram illustrating an example embodiment of a duty cycle calibrator 200 included in the clock generator of FIG. 1, which includes a multiplexing circuit 211 and 212, a comparison circuit DCCOM 220, a demultiplexer DMX 230, and a plurality of controllers. In an example embodiment, the plurality of controllers may include a first controller 241, a second controller 242, a third controller 243 and a fourth controller 244.

In an example embodiment, the multiplexing circuit 211 and 212 may include a first multiplexer MX1 211 and a second multiplexer MX2 212, and a select signal SEL[1:0] may be a two-bit signal including a lower bit signal SEL[0] and an upper bit signal SEL[1]. The first multiplexer 211 may generate one of the first quadrature clock signal SOI and the third quadrature clock signal SOIB based on the upper bit signal SEL[1] of the selection signal SEL[1:0], and output a first multiplexer signal SMX1. The second multiplexer 212 may generate one of the second quadrature clock signal SOQ and the fourth quadrature clock signal SOQB based on the lower bit signal SEL[0] of the selection signal SEL[1:0], and output a second multiplexer signal SMX2.

When the value of the selection signal SEL[1:0] is "00", the first multiplexer signal SMX1 corresponds to the first quadrature clock signal SOI and the second multiplexer signal SMX2 corresponds to the second quadrature clock signal SOQ. When the value of the selection signal SEL[1:0] is "10", the first multiplexer signal SMX1 corresponds to the third quadrature clock signal SOIB and the second multiplexer signal SMX2 corresponds to the second quadrature clock signal SOQ. When the value of the selection signal SEL[1:0] is "11", the first multiplexer signal SMX1 corresponds to the third quadrature clock signal SOIB and the second multiplexer signal SMX2 corresponds to the fourth quadrature clock signal SOQB.

As such, the multiplexing circuit 211 and 212 may select two quadrature clock signals having a phase difference of 90 degrees from among the first through fourth quadrature clock signals SOI, SOQ, SOIB and SOQB to generate the first multiplexer signal SMX1 and a second multiplexer signal SMX2. The comparison circuit 220 may convert the duty cycle of the first multiplexer signal SMX1 into a first direct current (DC) voltage, convert the duty cycle of the second multiplexer signal SMX2 into a second DC voltage, and generate a comparison result signal CMP by comparing the first DC voltage the second DC voltage. Example embodiments of the comparison circuit 220 will be described below with reference to FIG. 8.

The first controller 241, the second controller 242, the third controller 243 and the fourth controller 244 may provide, based on the comparison result signal CMP, the first duty control value DCI, the second duty control value DCQ, the third duty control value DCIB and the fourth duty control value DCQB, which are included in the duty control information CDC as described above. The first controller 241 may be implemented as a register REG, and the second controller 242, the third controller 243, and the fourth controller 244 may be implemented as accumulators ACC.

The demultiplexer 230 may provide the comparison result signal CMP to one of the plurality of controllers 241, 242, 243 and 244 based on the selection signal SEL[1:0]. The first controller 241 may store and provide the first duty control value DCI that is fixed as a constant value.

When the value of the selection signal SEL[1:0] is "00", the demultiplexer 230 may provide the comparison result signal CMP to the second controller 242. As a result, the second controller 242 may provide the second duty control value DCQ by accumulating the comparison result of the duty cycle of the first quadrature clock signal SOI and the duty cycle of the second quadrature clock signal SOQ. However, when the value of the selection signal SEL[1:0] is "10", the demultiplexer 230 may provide the comparison result signal CMP to the third controller 243. As a result, the third controller 243 may provide the third duty control value DCIB by accumulating the comparison result of the duty cycle of the second quadrature clock signal SOQ and the duty cycle of the third quadrature clock signal SOIB. Next, when the value of the selection signal SEL[1:0] is "11", the demultiplexer 230 may provide the comparison result signal CMP to the fourth controller 244. As a result, the fourth controller 243 may provide the fourth duty control value DCQB by accumulating the comparison result of the duty cycle of the third quadrature clock signal SOIB and the duty cycle of the fourth quadrature clock signal SOQB.

Figure 8:
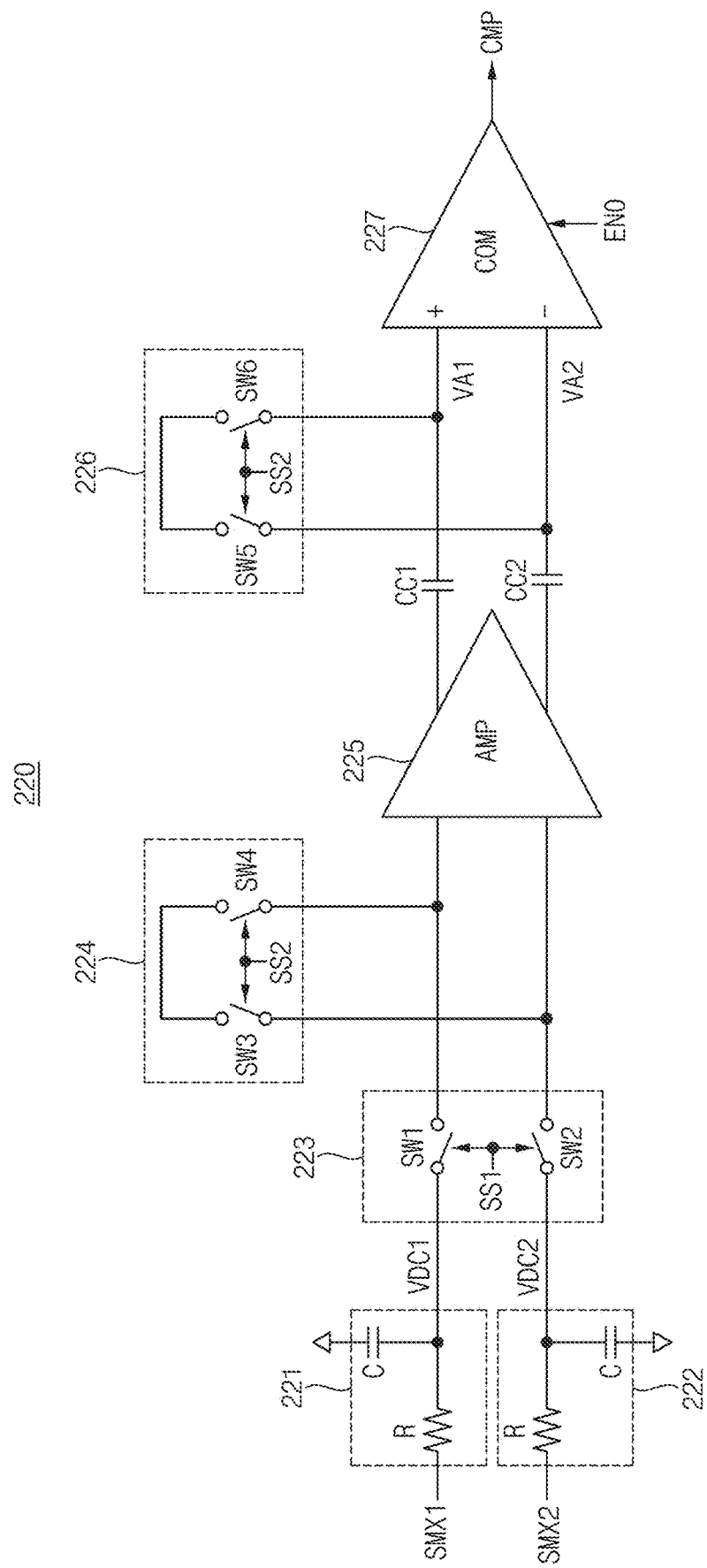
FIG. 8 is a diagram illustrating an example embodiment of a comparison circuit included in the duty cycle calibrator of FIG. 7.

FIG. 8 is a diagram illustrating an example embodiment of a comparison circuit included in the duty cycle calibrator of FIG. 7. Referring to FIG. 8, the comparison circuit 220 may include a first low pas filter 221 that filters the first multiplexer signal SMX1 to generate the first DC voltage VDC1, a second low pass filter 222 that filters the second multiplexer signal SMX2 to generate the second DC voltage VDC2, a pre-amplifier AMP 225 and a comparator COM 227. According to example embodiments, the comparison circuit 220 may further include a first switch circuit 223, a second switch circuit 224, a third switch circuit 226 and coupling capacitors CC1 and CC2.

The first low pass filter 221 may include a resistor R and a capacitor C, and may generate a first DC voltage VDC1 by filtering the first multiplexer signal SMX1. The second low pass filter 222 may include a resistor R and a capacitor C, and may generate a second DC voltage VDC2 by filtering the second multiplexer signal SMX2. The pre-amplifier 225 may generate a first comparison voltage VA1 and a second comparison voltage VA2 by amplifying a difference between the first DC voltage VDC2 and the second DC voltage VDC2. The comparator 227 may compare magnitudes of the first comparison voltage VA1 and the second comparison voltage VA2 to generate a comparison result signal CMP. The comparator 227 may latch the logic level of the comparison result signal CMP based on an output enable signal ENO.

The first switch circuit 223 may include switches SW1 and SW2 connected between the low pass filters 221 and 222 and input terminals of the pre-amplifier 225. The switches SW1 and SW2 may transfer the DC voltages VDC1 and VDC2 to the input terminals of the pre-amplifier 225 based on a first switch signal SS1. The second switch circuit 224 may include switches SW3 and SW4 connected between input terminals of the pre-amplifier 225. The switches SW3 and SW4 may equalize voltages of the input terminals of the pre-amplifier 225 based on a second switch signal SS2.

The coupling capacitors CC1 and CC2 may be connected between output terminals of the pre-amplifier 225 and input terminals of the comparator 227. The third switch circuit 226 may include switches SW5 and SW6 connected between the input terminals of the comparator 227. The switches SW5 and SW6 may equalize voltages of the input terminals of the comparator 227 based on the second switch signal SS2.

FIGS. 9 through 12B are diagrams illustrating a calibration operation of the duty cycle calibrator of FIG. 7. FIG. 9 illustrates a first calibration period PCAL1, a second calibration period PCAL2 and a third calibration period PCAL3 performed by the duty cycle calibrator 200. The first calibration cycle PCAL1, the second calibration cycle PCAL2 and the third calibration cycle PCAL3 performed by the duty cycle calibrator 200 may be periodically or non-periodically repeated, and the execution sequence is not limited to the order shown in FIG. 9.

Referring to FIGS. 7, 8 and 9, in the first calibration period PCAL1, the selection signal SEL[1:0] has a value of "00", and the first multiplexer signal SMX1 corresponds to the first quadrature clock signal SOI and the second multiplexer signal SMX2 corresponds to the second quadrature clock signal SOQ. At this time, the second controller 242 may update the second duty control value DCQ based on the comparison result signal CMP.

In the first calibration period PCAL1, the selection signal SEL[1:0] has a value of "00", the first multiplexer signal SMX1 corresponds to the first quadrature clock signal SOI, and the second multiplexer Signal SMX2 may correspond to the second quadrature clock signal SOQ. In this case, the second controller 242 may update the second duty control value DCQ based on the comparison result signal CMP. In the second calibration period PCAL2, the selection signal SEL[1:0] has a value of "10", the first multiplexer signal SMX1 corresponds to the third quadrature clock signal SOIB, and the second multiplexer Signal SMX2 corresponds to the second quadrature clock signal SOQ. In this case, the third controller 243 may update the third duty control value DCIB based on the comparison result signal CMP. In the third calibration period PCAL3, the selection signal SEL[1:0] has a value of "11", the first multiplexer signal SMX1 corresponds to the third quadrature clock signal SOIB, and the second multiplexer Signal SMX2 corresponds to the fourth quadrature clock signal SOQB. In this case, the fourth controller 244 may update the fourth duty control value DCQB based on the comparison result signal CMP.

Figure 10:
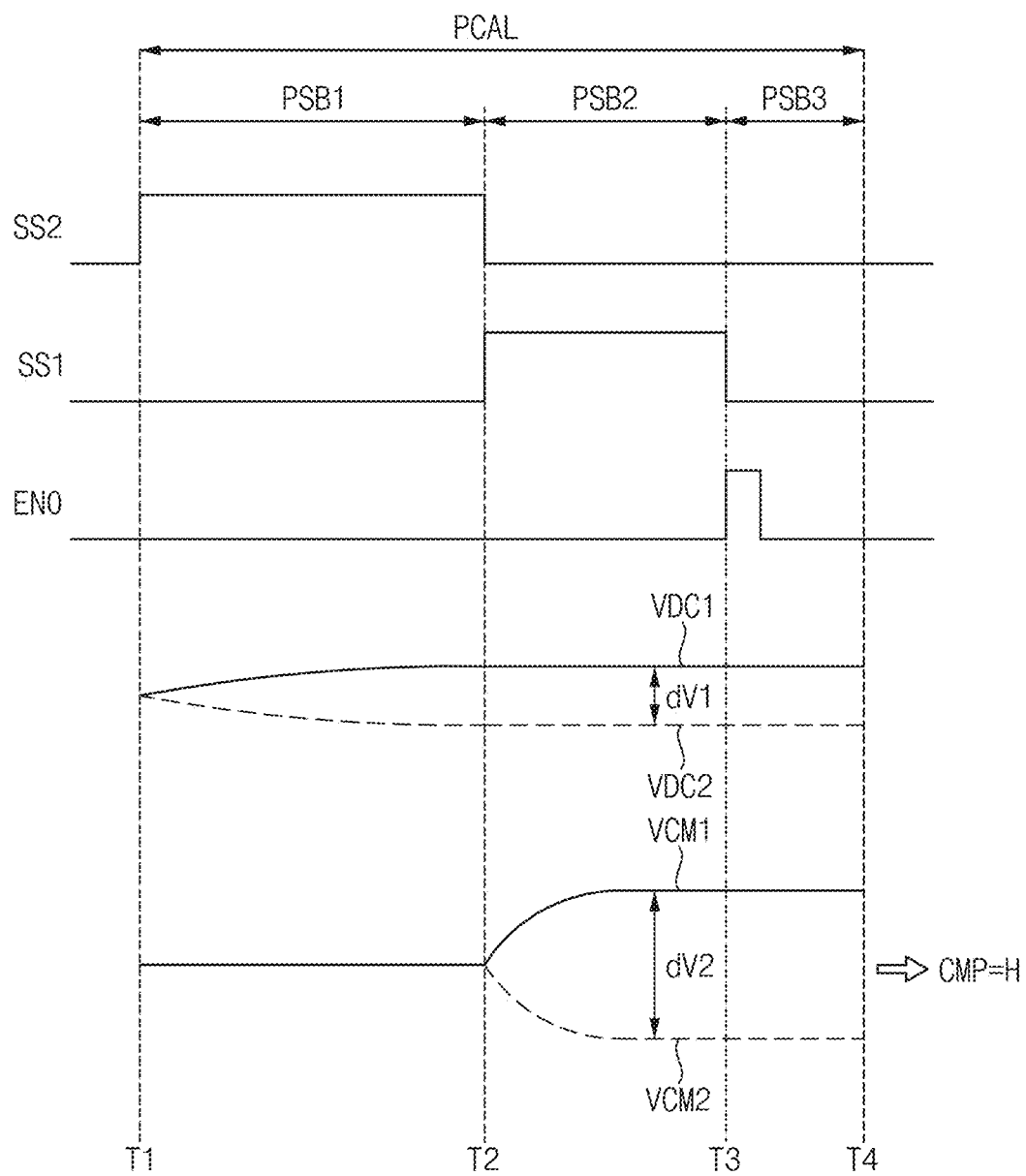

FIG. 10 illustrates the operation of the comparison circuit 220 of FIG. 8 in each calibration cycle PCAL of the first calibration cycle PCAL1, the second calibration cycle PCAL2, and the third calibration cycle PCAL3 of FIG. 9. Referring to FIG. 10, the calibration period PCAL includes a first sub-cycle PSB1 between time points T1 and T2, a second sub-cycle PSB2 between time points T2 and T3, and a third sub-cycle PSB3 between time points T3~T4.

Referring to FIGS. 8 and 10, in the first sub-cycle PSB1, the second switch signal SS2 is activated to turn on the switches SW3 and SW4 of the second switch circuit 224 and the third switch circuit 226. The switches SW5 and SW6 of are turned on to initialize the input terminals of the preamplifier 225 and the input terminals of the comparator 227. In the second sub-cycle PSB2, the first switch signal SS1 is activated, the switches SW1 and SW2 of the first switch circuit 223 are turned on and the DC voltages VDC1 and VDC2 are applied to the input terminals of the pre-amplifier 225. The pre-amplifier 225 may generate the comparison voltages VCM1 and VCM2 having an increased difference dV2 by amplifying the difference dV1 between the DC voltages VDC1 and VDC2. In the third sub-cycle PSB3, the comparator 227 compares the magnitudes of the first comparison voltage VA1 and the second comparison voltage VA2 and latches the logic level of the comparison result signal CMP in response to the activation of the output enable signal ENO. For example, when the first comparison voltage VA1 is greater than the second comparison voltage VA2, the comparison result signal CMP may have a logic high level H.

Figure 11:
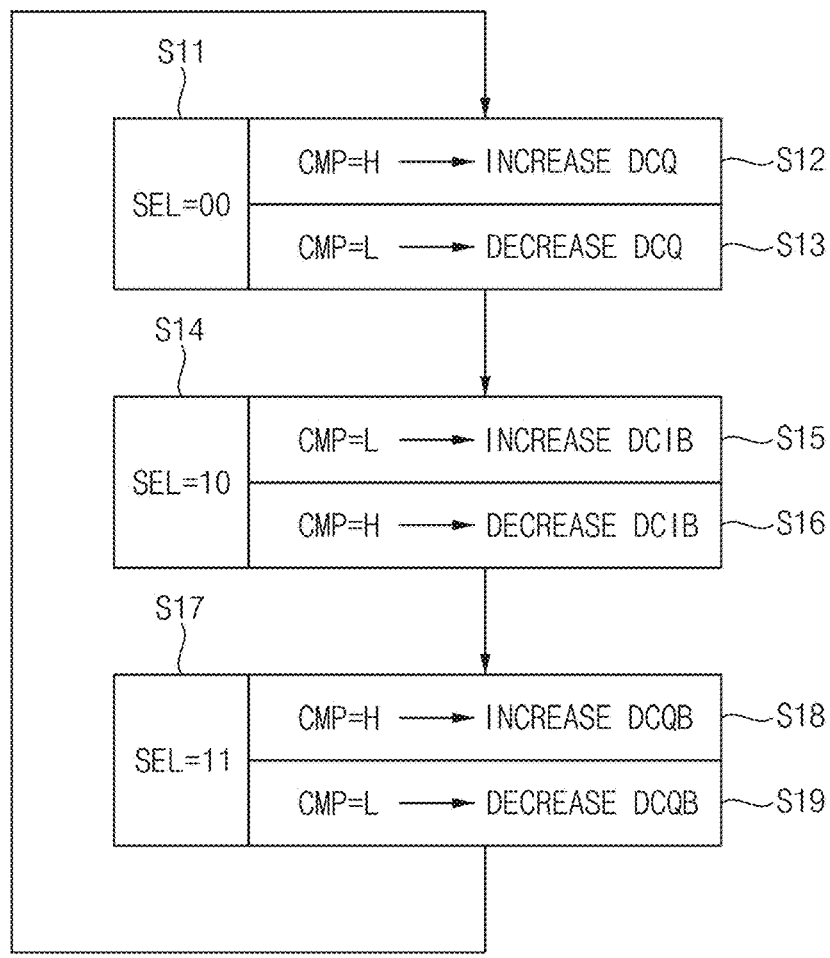

FIG. 11 illustrates an operation of updating the duty control values. Referring to FIGS. 7 through 11, in the first calibration period PCAL1, the selection signal SEL[1:0] may be set to a value of "00" (S11). When the comparison result signal CMP has a logic high level H, the second controller 242 may increase the second duty control value DCQ (S12). Meanwhile, when the comparison result signal CMP is a logic low level L, the second controller 242 may decrease the second duty control value DCQ (S13).

Figure 12A:
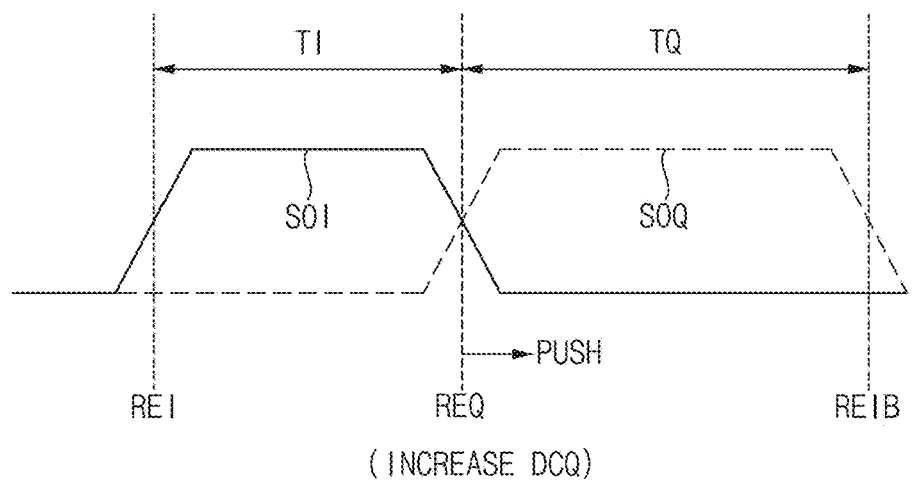
Figure 12B:
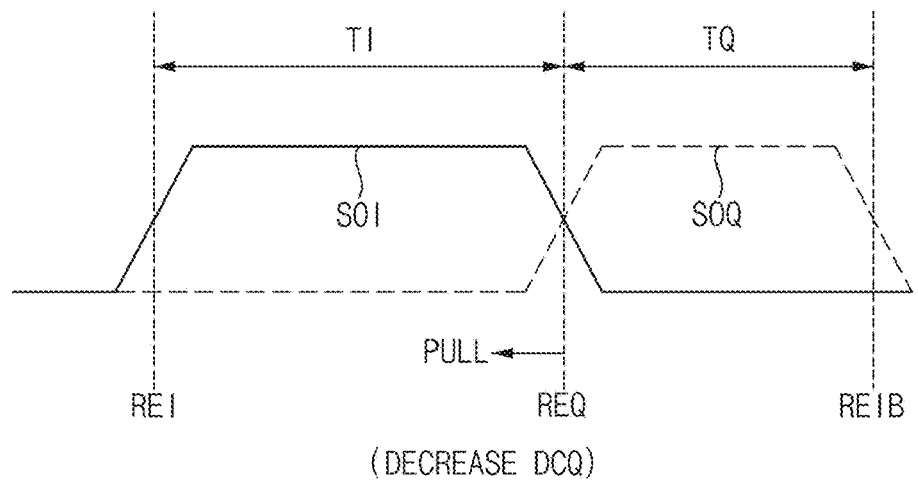

FIGS. 12A and 12B illustrate the activation time TI of the first quadrature clock signal SOI and the activation time TQ of the second quadrature clock signal SOQ. As can be seen with reference to FIG. 2, REI corresponds to the rising edge of the first oscillation signal SRI, REQ corresponds to the rising edge of the second oscillation signal SRQ, and REIB corresponds to the rising edge of the third oscillation signal SRIB.

When the second controller 242 increases the second duty control value DCQ (S12), the delay amount of the second buffer 122 of FIG. 5B increases such that the rising edge of the second oscillation signal SRQ is delayed, (PUSH), therefore, the activation time TI of the first quadrature clock signal SOI increases and the activation time TQ of the second quadrature clock signal SOQ decreases. As a result, the duty cycle of the first quadrature clock signal SOI increases and the duty cycle of the second quadrature clock signal SOQ decreases.

In contrast, when the second controller 242 decreases the second duty control value DCQ (S13), the delay amount of the second buffer 122 of FIG. 5B is reduced such that the rising edge of the second oscillation signal SRQ is advanced, (PULL), therefore, the activation time TI of the first quadrature clock signal SOI decreases and the activation time TQ of the second quadrature clock signal SOQ increases. As a result, the duty cycle of the first quadrature clock signal SOI increases and the duty cycle of the second quadrature clock signal SOQ decreases.

In this way, the duty cycle adjustment by comparing the duty cycles of the first quadrature clock signal SOI and the second quadrature clock signal SOQ may be repeated until the duty cycles of the first quadrature clock signal SOI and the second quadrature clock signal SOQ are stabilized to be equal to each other.

In the second calibration period PCAL2, the selection signal SEL[1:0] may be set to a value of "10" (S14). When the comparison result signal CMP is at the logic low level L, the third controller 243 may increase the third duty control value DCIB (S15). Meanwhile, when the comparison result signal CMP has the logic high level H, the third controller 243 may decrease the third duty control value DCIB (S16).

In the same way as described with reference to FIGS. 12A and 12B, the duty cycle adjustment by comparing the duty cycles of the second quadrature clock signal SOQ and the third quadrature clock signal SOIB may be repeated until the duty cycles of the second quadrature clock signal SOQ and the third quadrature clock signal SOIB are stabilized to be equal to each other.

In the third calibration period PCAL3, the selection signal SEL[1:0] may be set to a value of "11" (S17). When the comparison result signal CMP is at the logic high level H, the fourth controller 244 may increase the fourth duty control value DCQB (S18). Meanwhile, when the comparison result signal CMP is the logic low level L, the fourth controller 244 may decrease the fourth duty control value DCQB (S19).

In the same way as described with reference to FIGS. 12A and 12B, the duty cycle adjustment by comparing the duty cycles of the third quadrature clock signal SOIB and the fourth quadrature clock signal SOQB may be repeated until the duty cycles of the third quadrature clock signal SOIB and the fourth quadrature clock signal SOQB are stabilized to be equal to each other. As a result, the cyclic period of the first quadrature clock signal SOI, the cyclic period of the second quadrature clock signal SOQ, the cyclic period of the third quadrature clock signal SOIB and the cyclic period of the fourth quadrature clock signal SOQB may become stabilized and uniform repeating the first calibration period PCAL1, the second calibration period PCAL2, and the third calibration period PCAL3.

As described with reference to FIGS. 9 through 12B, the duty cycle calibrator 200 may provide the first duty control value DCI fixed as a constant value. The duty cycle calibrator 200 compares the duty cycles of the first quadrature clock signal SOI and the second quadrature clock signal SOQ, and generates the second duty control value DCQ for reducing the difference between the duty cycles of the first quadrature clock signal SOI and the second quadrature clock signal SOQ. The duty cycle calibrator 200 compares the duty cycles of the second quadrature clock signal SOQ and the third quadrature clock signal SOIB, and generates the third duty control value DCIB for reducing the difference between the duty cycles of the second quadrature clock signal SOQ and the third quadrature clock signal SOIB. The duty cycle calibrator 200 compares the duty cycles of the third quadrature clock signal SOIB and the fourth quadrature clock signal SOQB, and generates the fourth duty control value (DCQB) for reducing the difference between the duty cycles of the third quadrature clock signal SOIB and the fourth quadrature clock signal SOQB.

The conventional quadrature error corrector (QEC) is based on a DLL, has no effect of filtering the input signal noise, and consumes large power because it operates at the frequency of the input signals. In addition, since the conventional QEC operates based on a digital-to-time converter (DTC), the frequency range of the input signals is limited. On the other hand, the clock generator 100 according to example embodiments may filter noise of the input clock signal by the implementation based on a digital phase-locked loop, operate with low power by the operation in a state in which the frequency is lowered, and operate over a wide frequency range because it utilizes duty cycle comparison to correct quadrature errors.

Figure 13:
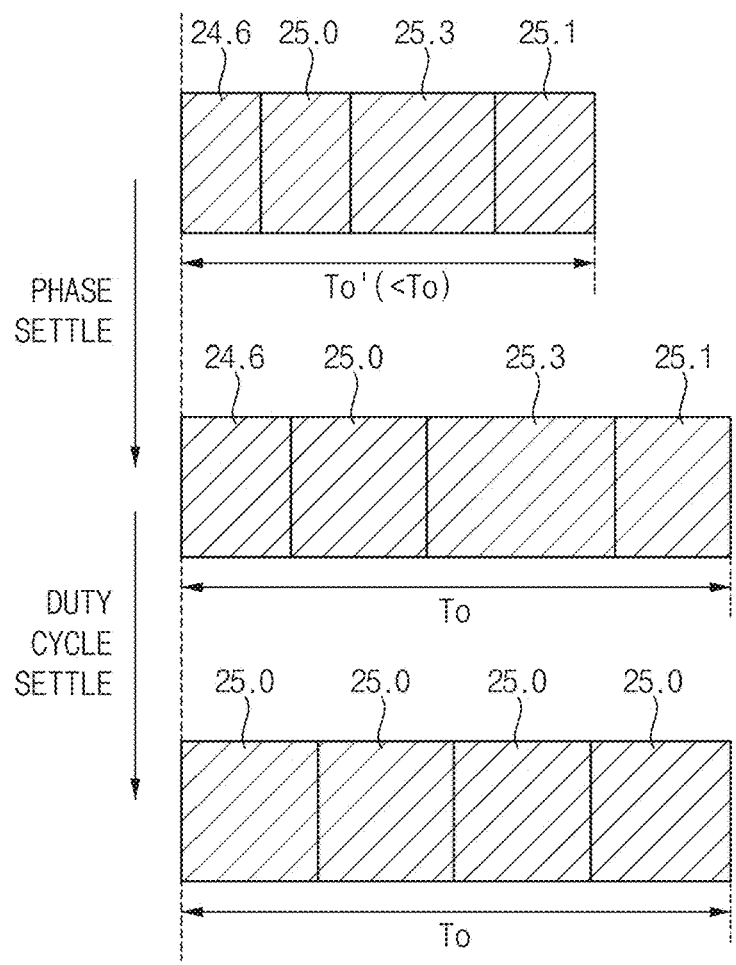
FIG. 13 is a diagram illustrating a result of overall operations of a clock generator according to example embodiments.

FIG. 13 is a diagram illustrating a result of overall operations of a clock generator according to example embodiments. FIG. 13 shows the duty cycles of the first quadrature clock signal SOI, the second quadrature clock signal SOQ, the third quadrature clock signal SOIB and the fourth quadrature clock signal SOQB described above in units of percentage. "To" represents the cyclic period or pulse period of the quadrature clock signals (or the output clock signals), and "To" corresponds to the reciprocal of the output frequency.

For example, when the output frequency of the quadrature clock signals is 2 GHz, the phase controller described with reference to FIG. 3 adjusts the phase with a bandwidth of about 30 MHZ, and the duty cycle calibrator 200 described with reference to FIG. 7 adjusts the duty cycle with a bandwidth of about 1 MHz. As a result, as shown in FIG. 13, the clock generator according to example embodiments may first stabilize the phases of a plurality of output clock signals (PHASE SETTLE), and then stabilize the duty cycle (DUTY CYCLE SETTLE). Through phase stabilization, the initial clock cycle To' of the quadrature clock signals converges to the cycle period To corresponding to the output frequency of the quadrature clock signals. Then, through duty cycle stabilization, the duty cycles of the quadrature clock signals uniformly converge to 25%.

Figure 14A:
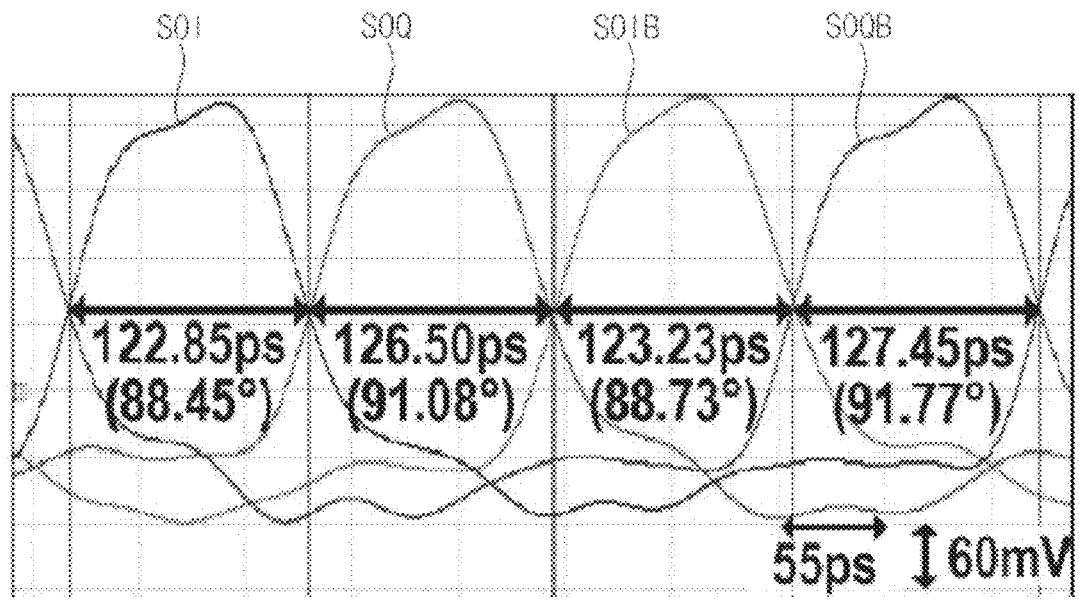
FIGS. 14A through 15B are diagram illustrating effects of a clock generator according to example embodiments.
Figure 14B:
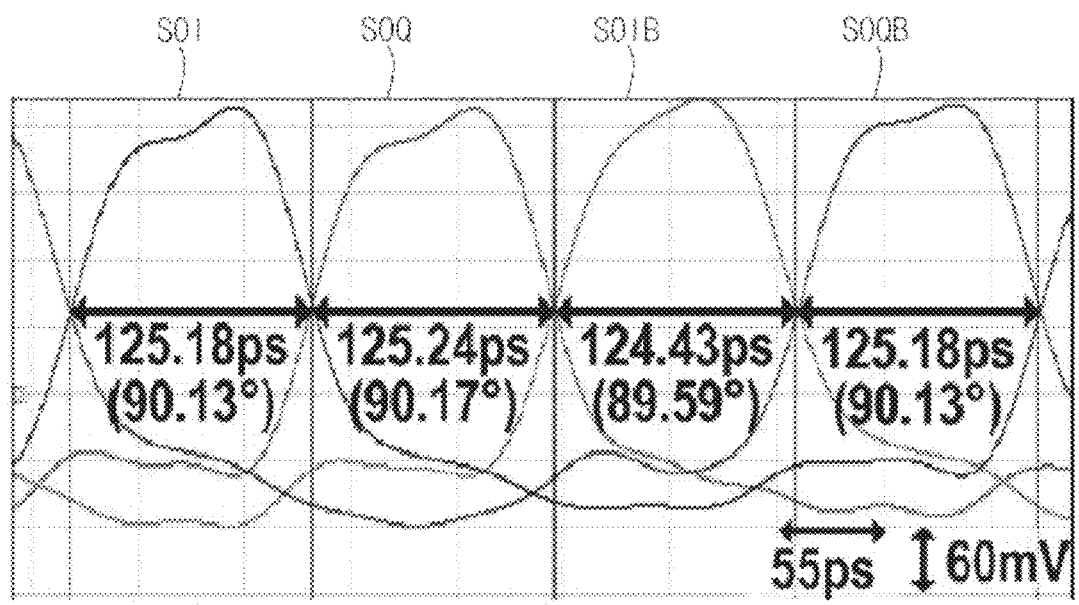

FIGS. 14A through 15B are diagram illustrating effects of a clock generator according to example embodiments. FIGS. 14A and 14B illustrate the duty cycles of the quadrature clock signals SOI, SOQ, SOIB and SOQB with the output frequency of 2 GHz. FIG. 14A shows a case where the duty cycle calibrator 200 is disabled, and FIG. 14B shows a case where the duty cycle calibrator is enabled to calibrate the duty cycle. It can be seen that the quadrature error is reduced from about 1.77° to 0.41° using the duty cycle calibrator 200 according to example embodiments.

Figure 15A:
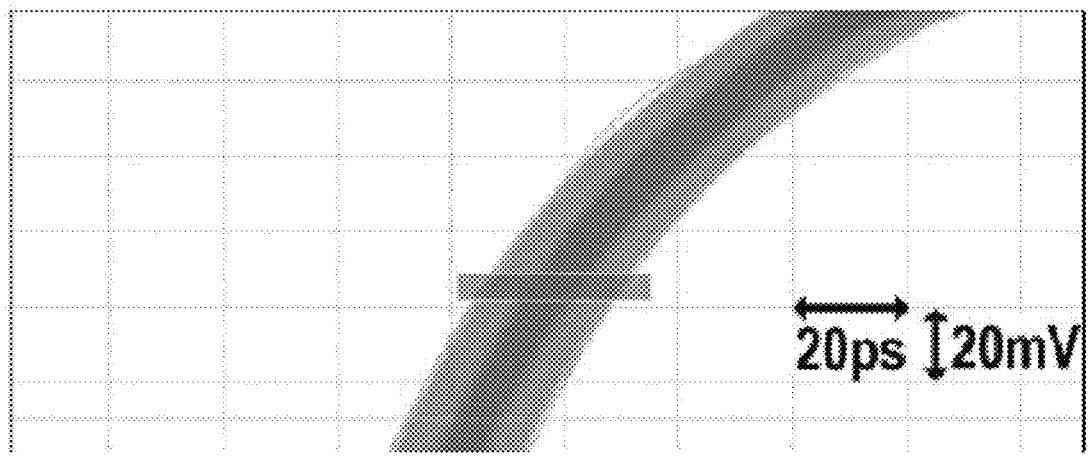
Figure 15B:
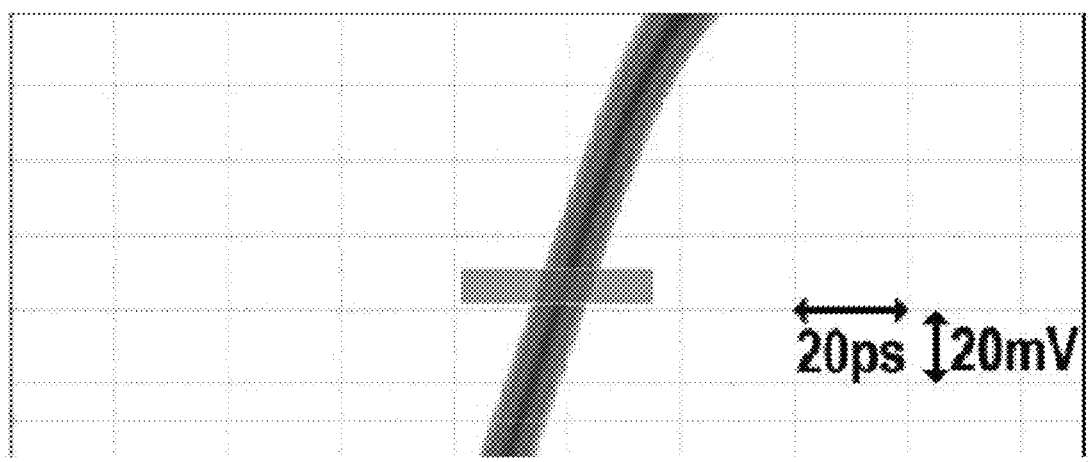

FIG. 15A shows an external clock signal having an output frequency of 2 GHZ before dividing the input clock signal SIN, and FIG. 15B shows one quadrature clock signal generated by a clock generator according to example embodiments. It can be seen that the root mean square (RMS) of the noise of the external clock signal is about 2.94 ps (pico seconds), whereas the root mean square of the noise of the quadrature clock signal generated by the clock generator according to example embodiments is significantly reduced to about 1.22 ps.

Figure 16:
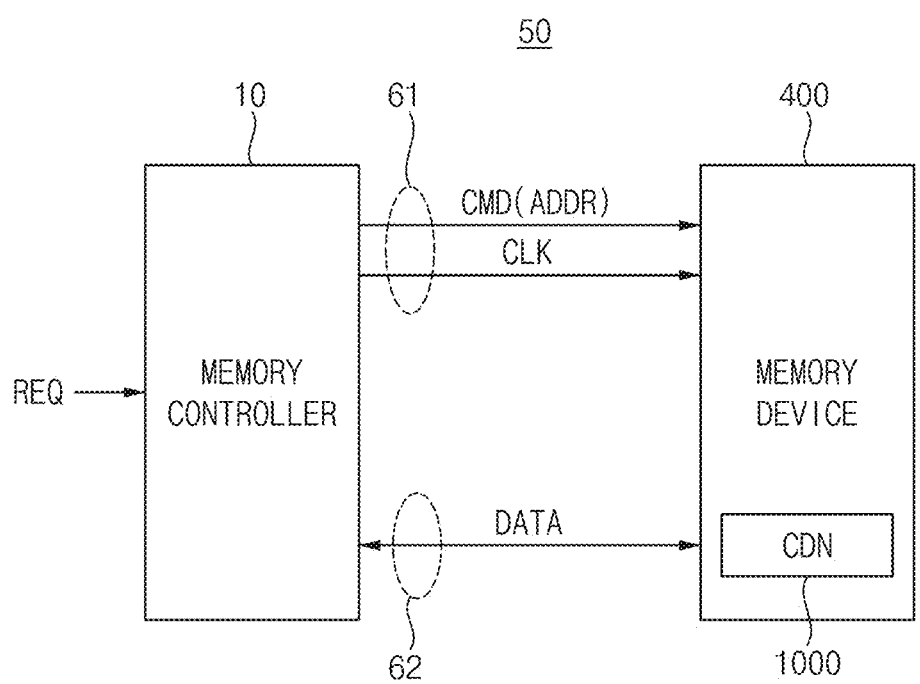
FIG. 16 is a block diagram illustrating a memory system according to example embodiments.

FIG. 16 is a block diagram illustrating a memory system 50 according to example embodiments. This memory system 50 is shown as including a memory controller 10 and a memory device 400. The memory controller 10 and the memory device 400 may communicate through a memory interface. The memory interface may include a control bus 61 for transferring a command CMD, an access address ADDR, a clock signal CLK, and the like, and a data bus 62 for transferring data.

Depending on the type of memory device 400, the command CMD may be regarded as including the access address ADDR. The memory controller 10 may generate a command signal CMD for controlling the memory device 400 and perform a write operation in which data DATA is written into the semiconductor memory device 400 under the control of the memory controller 10 or a read operation in which data DATA is read from the semiconductor memory device 400. The memory device 400 may be implemented using a clock distribution network CDN 1000 as will be described below with reference to FIGS. 18 through 22.

Figure 17A:
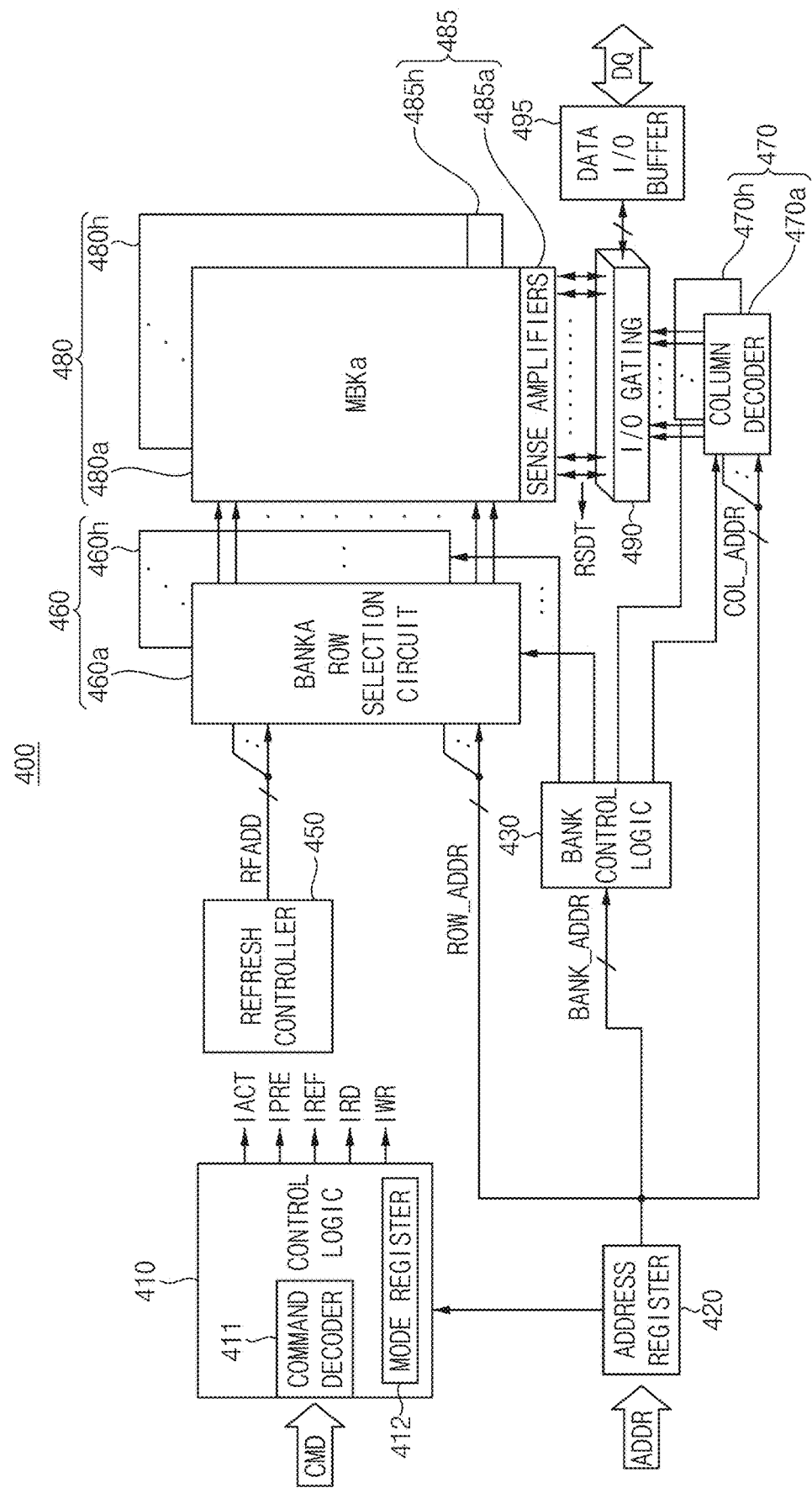
FIG. 17A is a block diagram illustrating a semiconductor memory device according to example embodiments.

FIG. 17A is a block diagram illustrating a semiconductor memory device according to example embodiments. Referring to FIG. 17A, a semiconductor memory device 400 may include a command control logic 410, an address register 420, a bank control logic 430, a row selection circuit 460 (or row decoder), a column decoder 470, a memory cell array 480, a sense amplifier unit 485, an input/output (I/O) gating circuit 490, a data input/output (I/O) buffer 495, and a refresh controller 450.

The memory cell array 480 may include a plurality of bank arrays 480a, ..., 480h. The row selection circuit 460 may include a plurality of bank row selection circuits 460a, ..., 460h respectively coupled to the bank arrays 480a, ..., 480h. The column decoder 470 may include a plurality of bank column decoders 470a, ..., 470h respectively coupled to the bank arrays 480a, ..., 480h. The sense amplifier unit 485 may include a plurality of bank sense amplifiers 485a, ..., 485h respectively coupled to the bank arrays 480a, ..., 480h. The address register 420 may receive an address ADDR including a bank address BANK_ADDR, a row address ROW_ADDR, and a column address COL_ADDR from the memory controller 200. The address register 420 may provide the received bank address BANK_ADDR to the bank control logic 430, may provide the received row address ROW_ADDR to the row selection circuit 460, and may provide the received column address COL_ADDR to the column decoder 470.

The bank control logic 430 may generate bank control signals in response to the bank address BANK_ADDR. One of the bank row selection circuits 460a, ..., 460h corresponding to the bank address BANK_ADDR may be activated in response to the bank control signals, and one of the bank column decoders 470a, ..., 470h corresponding to the bank address BANK_ADDR may be activated in response to the bank control signals.

The row address ROW_ADDR from the address register 420 may be applied to the bank row selection circuits 460a, ..., 460h. The activated one of the bank row selection circuits 460a, ..., 460h may decode the row address ROW_ADDR, and may activate a wordline corresponding to the row address ROW_ADDR. For example, the activated bank row selection circuit 460 may apply a wordline driving voltage to the wordline corresponding to the row address ROW_ADDR.

The column decoder 470 may include a column address latch. The column address latch may receive the column address COL_ADDR from the address register 420, and may temporarily store the received column address COL_ADDR. In some example embodiments, in a burst mode, the column address latch may generate column addresses that increment from the received column address COL_ADDR. The column address latch may apply the temporarily stored or generated column address to the bank column decoders 470a, . . . , 470h. The activated one of the bank column decoders 470a, . . . , 470h may decode the column address COL_ADDR, and may control the I/O gating circuit 490 to output data corresponding to the column address COL_ADDR. The I/O gating circuit 490 may include circuitry for gating input/output data. The I/O gating circuit 490 may further include read data latches for storing data that is output from the bank arrays 480a, . . . , 480h, and write drivers for writing data to the bank arrays 480a, . . . , 480h.

Data to be read from one bank array of the bank arrays 480a, . . . , 480h may be sensed by one of the bank sense amplifiers 485a, . . . , 485h coupled to the one bank array from which the data is to be read, and may be stored in the read data latches. The data stored in the read data latches may be provided to the memory controller 200 via the data I/O buffer 495. Data DQ to be written in one bank array of the bank arrays 480a, . . . , 480h may be provided to the data I/O buffer 495 from the memory controller 200. The write driver may write the data DQ in one bank array of the bank arrays 480a, . . . , 480h.

The command control logic 410 may control operations of the memory device 400. For example, the command control logic 410 may generate control signals for the memory device 400 to perform a write operation, a read operation, or a refresh operation. The command control logic 410 may generate internal command signals, such as an active signal IACT, a precharge signal IPRE, a refresh signal IREF, a read signal IRD, a write signal IWR, etc., based on commands CMD transferred from the memory controller. The command control logic 410 may include a command decoder 411 that decodes the commands CMD received from the memory controller 200 and a mode register set 412 that sets an operation mode of the memory device 400.

The refresh controller 450 may control the refresh operation with respect to the memory cells included in the memory cell array 480, and generate a refresh address RFADD indicating the location where the refresh operation is performed in the memory cell array 480.

Although the command control logic 410 and the address register 420 are shown as separate components in FIG. 17A, the command control logic 410 and the address register 420 may be implemented as one indivisible component. In addition, although the command CMD and the address ADDR are shown as being provided as separate signals in FIG. 17A, the address may be regarded as being included in the command as presented in the DDR4, DDR5, HBM, LPDDR5 standards, etc.

Figure 17B:
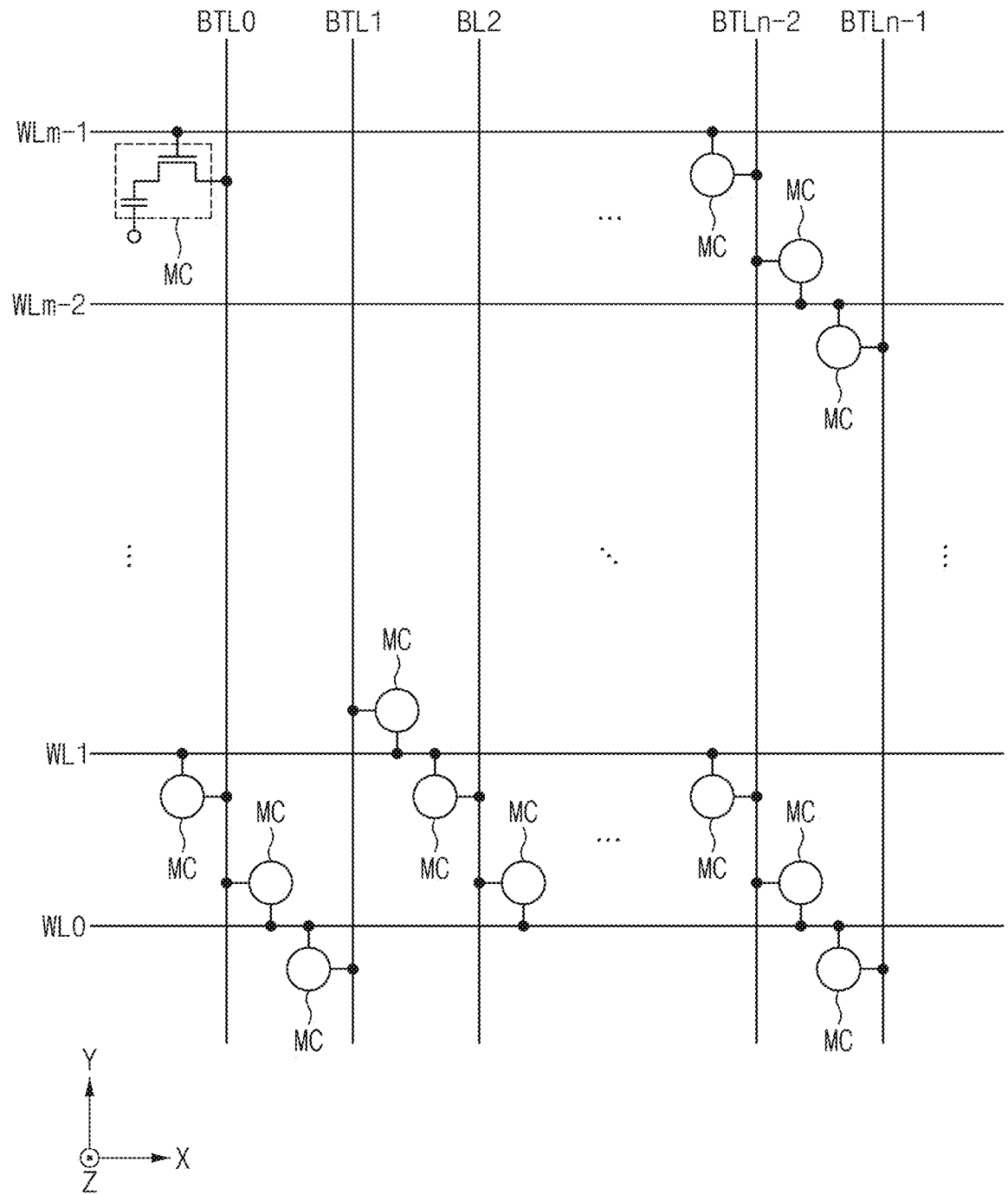
FIG. 17B is a diagram illustrating a bank array included in the memory device of FIG. 17A.

FIG. 17B is a diagram illustrating a bank array included in the memory device of FIG. 17A. The first bank arrays 480a may be representative of the first through eighth bank arrays 480a to 480h in FIG. 17A. Referring to FIG. 17B, the first bank array 480a may include a plurality of wordlines WL0~WLm-1, where m is an even integer equal to or greater than two, a plurality of bitlines BTL0~BTLn-1, where n is an even integer equal to or greater than two, and a plurality of memory cells MC disposed at intersections between the wordlines WL0~WLm-1 and the bitlines BTL0~BTLn-1.

In some example embodiments, each of the memory cells MC may include a DRAM cell. The arrangement of the plurality of memory cells MC may differ based on whether a memory cell MC is coupled to an even wordline (for example, wordline WL0) or to an odd wordline (for example, wordline WL1). For example, a bitline coupled to adjacent memory cells MC may be selected based on whether a wordline selected by an access address is an even wordline or an odd wordline.

Figure 18:
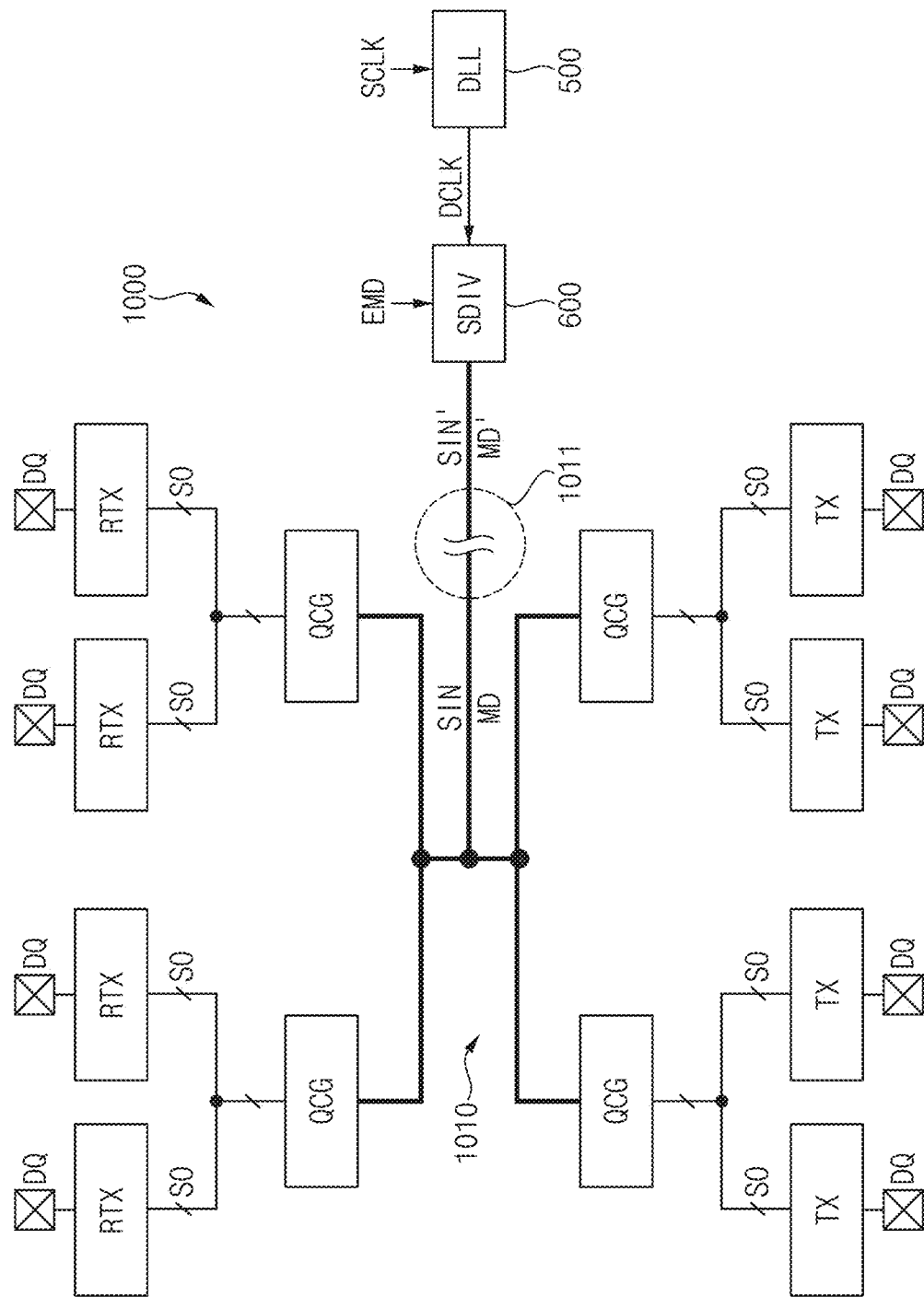
FIG. 18 is a diagram illustrating a clock distribution network applicable to a semiconductor memory device according to example embodiments.
Figure 19:
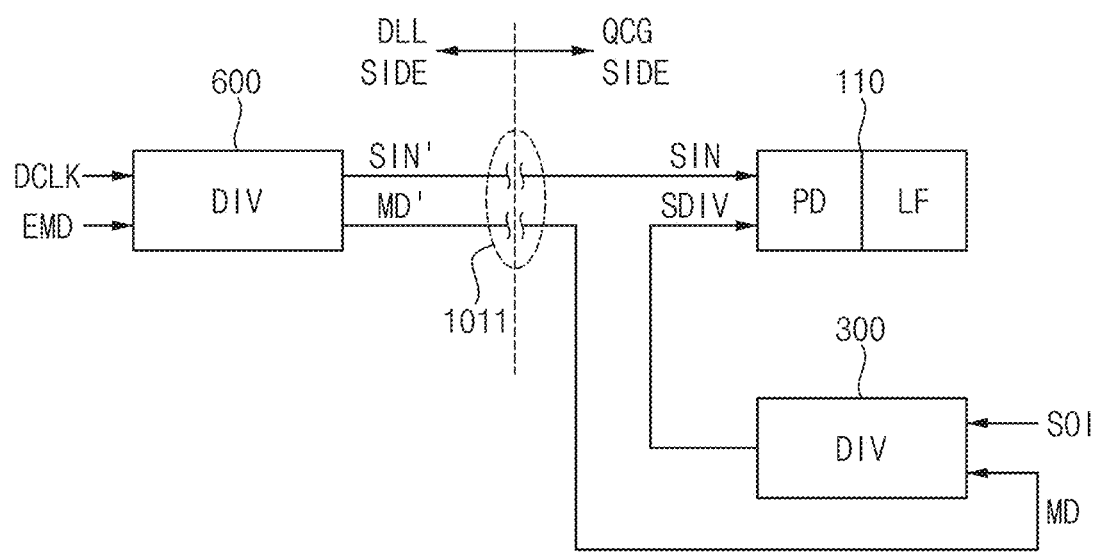
FIG. 19 is a diagram illustrating a portion of the clock distribution network of FIG. 18.

FIG. 18 is a diagram illustrating a clock distribution network applicable to a semiconductor memory device according to example embodiments, and FIG. 19 is a diagram illustrating a portion of the clock distribution network of FIG. 18. Referring to FIGS. 18 and 19, a clock distribution network 1000 of a semiconductor memory device may include a plurality of data pins DQ, a delay-locked loop DLL 500, a global clock divider SDIV 600, a clock tree structure 1010, a plurality of clock generators OCG, and a plurality of interface circuits RTX.

The semiconductor memory device may exchange data with the memory controller through the plurality of data pins DQ. The delay-locked loop 500 may generate a delayed clock signal DCLK by delaying a system clock signal SCLK. For example, the system clock signal SCLK may be provided from the memory controller. The delay-locked loop 500 may monitor the operation skew between the memory controller and the semiconductor memory device in real time and generate the delay clock signal DCLK by delaying the system clock signal SCLK such that operations of the memory controller and the semiconductor memory device may be synchronized.

The global clock divider 600 may divide the frequency of the delayed clock signal DCLK to generate an input clock signal SIN' having a frequency smaller than that of the system clock signal SCLK. The clock tree structure 1010 (indicated by a thick line in FIG. 18) may transfer the input clock signal SIN' output from the global clock divider 600. The data pins DQ may be distributed and arranged in the semiconductor memory device, and the clock tree structure 1010 may have various structures for supplying clock signals to the arranged data pins DQ.

The plurality of clock generators QCG may receive the input clock signal SIN through the clock tree structure 1010 and respectively generate a plurality of output clock signals SO based on the input clock signal SIN. The plurality of interface circuits RTX may process the data exchanged through the plurality of data pins DQ based on the plurality of output clock signals SO respectively provided from the plurality of clock generators QCG. Each interface circuit RTX may include a reception circuit receiving write data transferred from the memory controller to the semiconductor memory device and a transmission circuit transmitting read data transferred from the semiconductor memory device to the memory controller. In particular, the plurality of output clock signals SO may be used to parallelize serial data in the transmission circuit.

As described above with reference to FIG. 1, each clock generator QCG may include the phase controller 110, the oscillator 120, the duty cycle converter 130, the clock divider 300, and the duty cycle calibrator 200. The phase controller 110 may generate the phase control information CPS by comparing the phases of the input clock signal SIN and the division clock signal SDIV. The oscillation unit 120 may generate the plurality of oscillation signals SR having the output frequency and the different phases based on the phase control information CPS and the duty control information CDC. The duty cycle converter 130 may convert the duty cycles of the plurality of oscillation signals SR to generate the plurality of output clock signals SO having the output frequency and the duty cycles smaller than those of the plurality of oscillation signals SR. The clock divider 300 may divide the frequency of one output clock signal SOI from among the plurality of output clock signals SO to generate the division clock signal SDOV having the smaller division frequency than the output frequency. The duty cycle calibrator 200 may detect the difference in duty cycles of the plurality of output clock signals SO and generate the duty control information CDC for adjusting the difference in duty cycles of the plurality of output clock signals SO.

In some example embodiments, the frequency of the input clock signal SIN transferred through the clock tree structure 1010 may be changed according to the operation mode. For example, the system clock signal SCLK and the plurality of output clock signals SO have an output frequency (e.g., 2 GHZ) regardless of the operation mode, and the input clock signal SIN may have a first division frequency (e.g., 250 MHz) in an active mode and a second division frequency (e.g., 31.25 MHZ) smaller than the first division frequency.

In this case, the global clock divider 600 may selectively operate in the active mode or the idle mode based on and external mode signal EMD. The global clock divider 600 may generate the input clock signal SIN' and the mode signal MD' such that the input clock signal SIN' may have the first division frequency in the active mode and the second division frequency in the idle mode, and the mode signal MD' may be synchronized with the input clock signal SIN'. The mode signal MD' may be transferred from the global clock divider 600 to the clock divider 300 included in each clock generator QCG through the clock tree structure 1010.

The clock tree structure 1010 may include a relatively long routing 1011, and as will be described below with reference to FIG. 22, the clock tree structure may provide, to the plurality of clock generators QCG, the input clock signal SIN and the mode signal MD that are delayed through the long routing 1011 than the input clock signal SIN' and the mode signal MD' output from the global clock divider 600. The clock divider 300 included in each of the clock generators QCG may selectively operate in the active mode or the idle mode based on the mode signal MD. The clock divider 300 may generate the division clock signal SDIV having the first division frequency in the active mode and the second division frequency in the idle mode.

Figure 20:
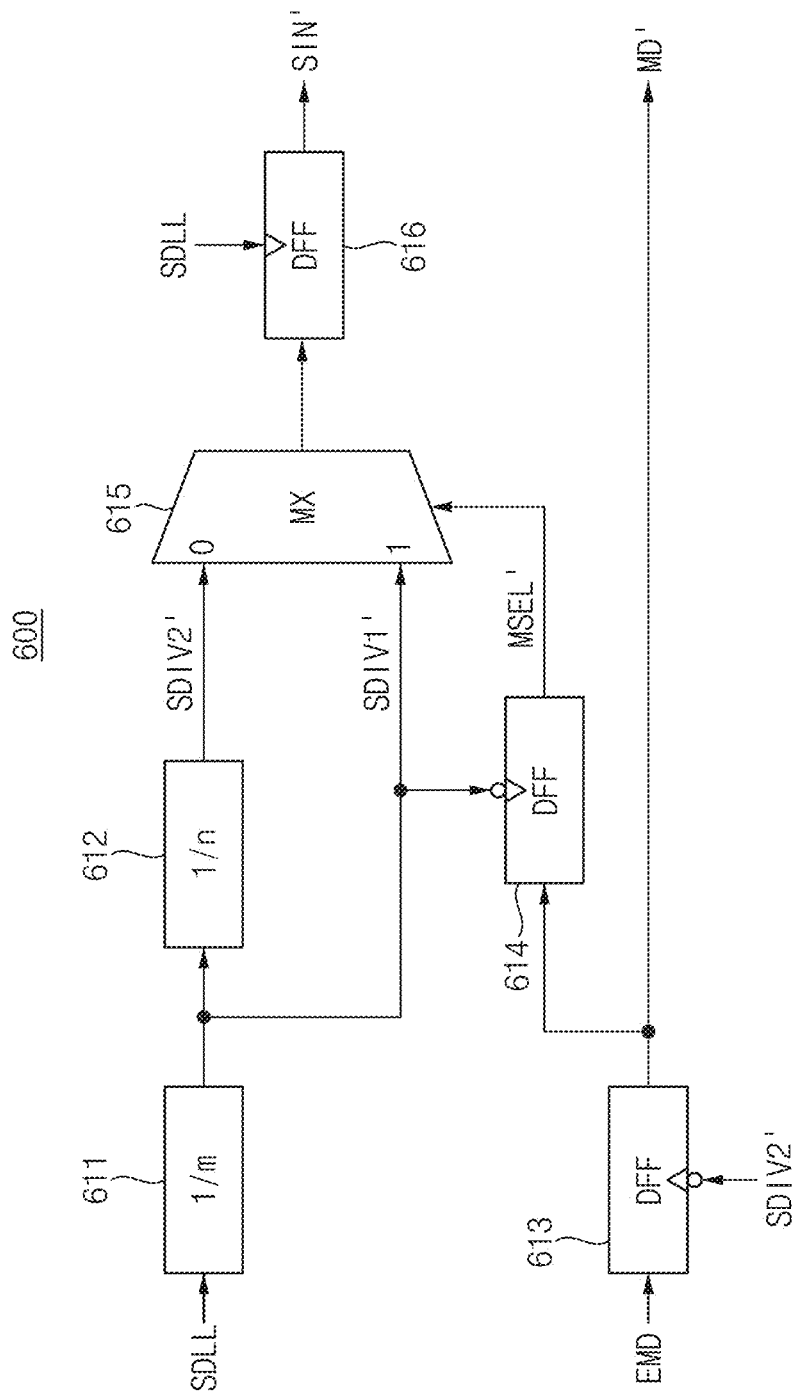
FIG. 20 is a diagram illustrating an example embodiment of a global clock divider included in the clock distribution network of FIG. 18.

FIG. 20 is a diagram illustrating an example embodiment of a global clock divider 600 included in the clock distribution network of FIG. 18. This global clock divider 600 may include a first divider 611, a second divider 612, a first flip-flop (DFF) 613, a second flip-flop 614, a multiplexer (MX) 615 and a third flip-flop 616. The first divider 611 may divide the frequency of the delayed clock signal SDLL (e.g., DCLK in FIGS. 18 and 19) with a first division rate (1/m) to generate the first division clock signal SDIV1'. The second divider 612 may divide the frequency of the first division clock signal SDIV1' with a second division ratio (1/n) to generate the second division clock signal SDIV2'. The first division clock signal SDV1' may have a first division frequency (e.g., 250 MHZ), and the second division clock signal SDV2' may have a second division frequency (e.g., 31.25 MHz) smaller than the first division frequency.

The first flip-flop 613 may generate the mode signal MD' by latching the external mode signal EMD in synchronization with the second division clock signal SDIV2'. For example, the first flip-flop 613 may generate the mode signal MD' by latching the external mode signal EMD at the rising edge of the second division clock signal SDIV2'.

The second flip-flop 614 may generate the mode selection signal MSEL' by latching the mode signal MD' in synchronization with the first division clock signal SDIV1'. For example, the second flip-flop 614 may generate the mode selection signal MSEL' by latching the mode signal MD' at the falling edge of the first division clock signal SDIV1'.

The multiplexer 615 may select and output one of the first division clock signal SDIV1' and the second division clock signal SDIV2' based on the mode selection signal MSEL'. For example, the multiplexer 615 may output the first division clock signal SDIV1' when the mode selection signal MSEL' has a logic high level (i.e., a value of "1"), and output the second division clock signal SDIV2' when the mode selection signal MSEL' has a logic low level (i.e., a value of "0").

The third flip-flop 616 may generate the input clock signal SIN' by latching the output of the multiplexer 615 in synchronization with the delayed clock signal SDLL. For example, the third flip-flop 616 may generate the input clock signal SIN' by latching the output of the multiplexer 615 at the rising edge of the delayed clock signal SDLL.

Figure 21:
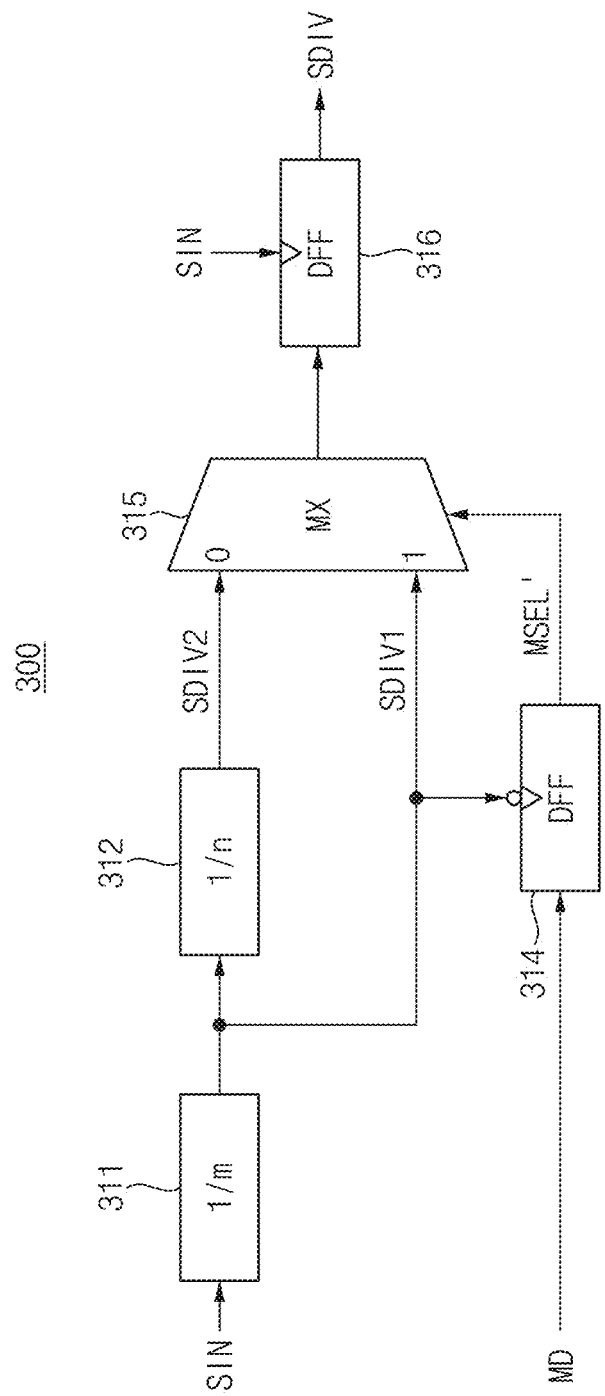
FIG. 21 is a diagram illustrating an example embodiment of a clock divider included in each clock generator of the clock distribution network of FIG. 18.

FIG. 21 is a diagram illustrating an example embodiment of a clock divider included in each clock generator of the clock distribution network of FIG. 18. Referring to FIG. 21, the clock divider 300 included in each clock generator QCG may include a first divider 311, a second divider 312, a first flip-flop (DFF) 314, a multiplexer (MX) 315 and a second flip-flop 316.

The first divider 311 may generate a first division clock signal SDIV1 by dividing the frequency of the input clock signal SIN with a first division ratio (1/m). The second divider 312 may generate a second division clock signal SDV2 by dividing the frequency of the first division clock signal SDV1 with a second division ratio (1/n). The first division clock signal SDV1 may have a first division frequency (e.g., 250 MHZ), and the second division clock signal SDV2' may have a second division frequency (e.g., 31.25 MHZ) smaller than the first division frequency.

The first flip-flop 314 may generate the mode selection signal MSEL by latching the mode signal MD in synchronization with the first division clock signal SDIV1. For example, the first flip-flop 314 may generate the mode selection signal MSEL by latching the mode signal MD at the falling edge of the first division clock signal SDIV1.

The multiplexer 315 may select and output one of the first division clock signal SDIV1 and the second division clock signal SDIV2 based on the mode selection signal MSEL. For example, the multiplexer 315 may output the first division clock signal SDIV1 when the mode selection signal MSEL has a logic high level (i.e., a value of "1"), and output the second division clock signal SDIV2 when the mode selection signal MSEL has a logic low level (i.e., a value of "0").

The second flip-flop 316 may generate the division clock signal SDIV by latching the output of the multiplexer 315 in synchronization with the input clock signal SIN. For example, the second flip-flop 316 may generate the division clock signal SDIV by latching the output of the multiplexer 315 at the rising edge of the input clock signal SIN.

Figure 22:
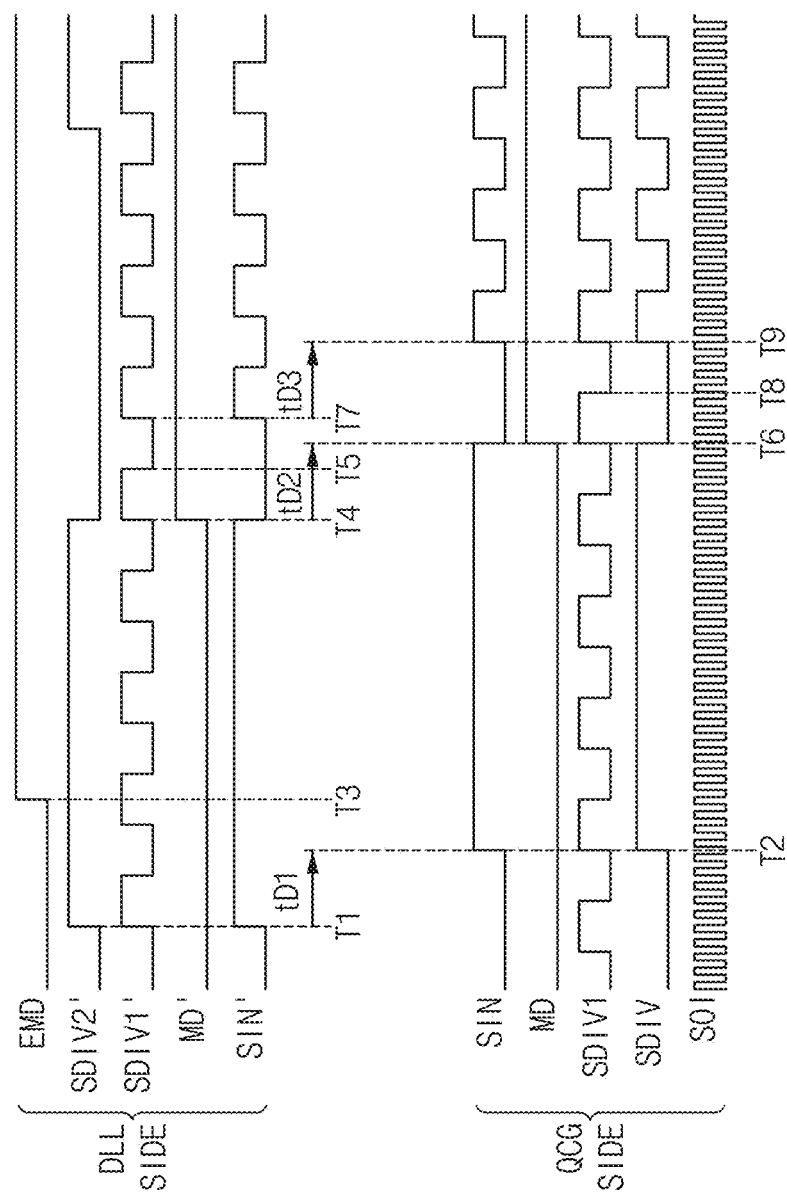
FIG. 22 is a timing diagram illustrating operations of the global clock divider of FIG. 20 and the clock divider of FIG. 21.

FIG. 22 is a timing diagram illustrating operations of the global clock divider of FIG. 20 and the clock divider of FIG. 21. Examples of the external mode signal EMD, the first division clock signal SDIV1', the second division clock signal SDIV2', the mode signal MD' and the input clock signal SIN' of the DLL side (that is, of the global clock divider 600 of FIG. 20) are illustrated in the upper portion of FIG. 22. Examples of the input clock signal SIN, the mode signal MD, the first division clock signal SDIV1, the division clock signal SDIV and the first quadrature clock signal SOI of the QCG side (that is, of the clock divider 300 of FIG. 21) are illustrated in the lower portion of FIG. 22.

Referring to FIGS. 18 through 22, through the long routing 1011 of the clock tree structure 1010, the edge T2 of the input clock signal SIN on the QCG side may be delayed from the edge T1 of the input clock signal SIN' on the DLL side by a first delay time tD1. In addition, through the long routing 1011 of the clock tree structure 1010, the edge T6 of the mode signal MD' on the QCG side may be delayed from the rising edge T4 of the mode signal MD' on the DLL side by a second delay time tD2. Further, the frequency change time point T9 on the QCG side may be delayed from the frequency change time point T7 on the DLL side by a third delay time tD3. The first delay time tD1, the second delay time tD2 and the third delay time tD3 may be substantially the same. Moreover, at time point T2, the external mode signal EMD may transition from a logic low level indicating the idle mode to a logic high level indicating the active mode.

In the case of the global clock divider 600, the second flip-flop 614 may latch the mode signal MD' in synchronization with the falling edge T5 of the first division clock signal SDIV1', and the third flip-flop 616 may latch the output of the multiplexer 615 in synchronization with the rising edge T7 of the first division clock signal SDIV1'. As a result, a glitch of the input clock signal SIN that may occur at the frequency change time point T7 between the active mode and the idle mode may be prevented.

In the case of the clock divider 300 included in each clock generator QCG, the first flip-flop 314 may latch the mode signal MD in synchronization with the falling edge T8 of the first division clock signal SDIV1, and the second flip-flop 316 may latch the output of the multiplexer 315 in synchronization with the rising edge T9 of the input clock signal SIN. As a result, a glitch of the division clock signal SDIV that may occur at the frequency change time point T9 between the active mode and the idle mode may be prevented. As described with reference to FIGS. 20 through 22, the clock generator according to example embodiments may implement the clock divider with a synchronous mode-switching (SMS) clock divider. The operation mode may be changed from idle mode to the active mode without glitches through the SMS clock divider.

Figure 23:
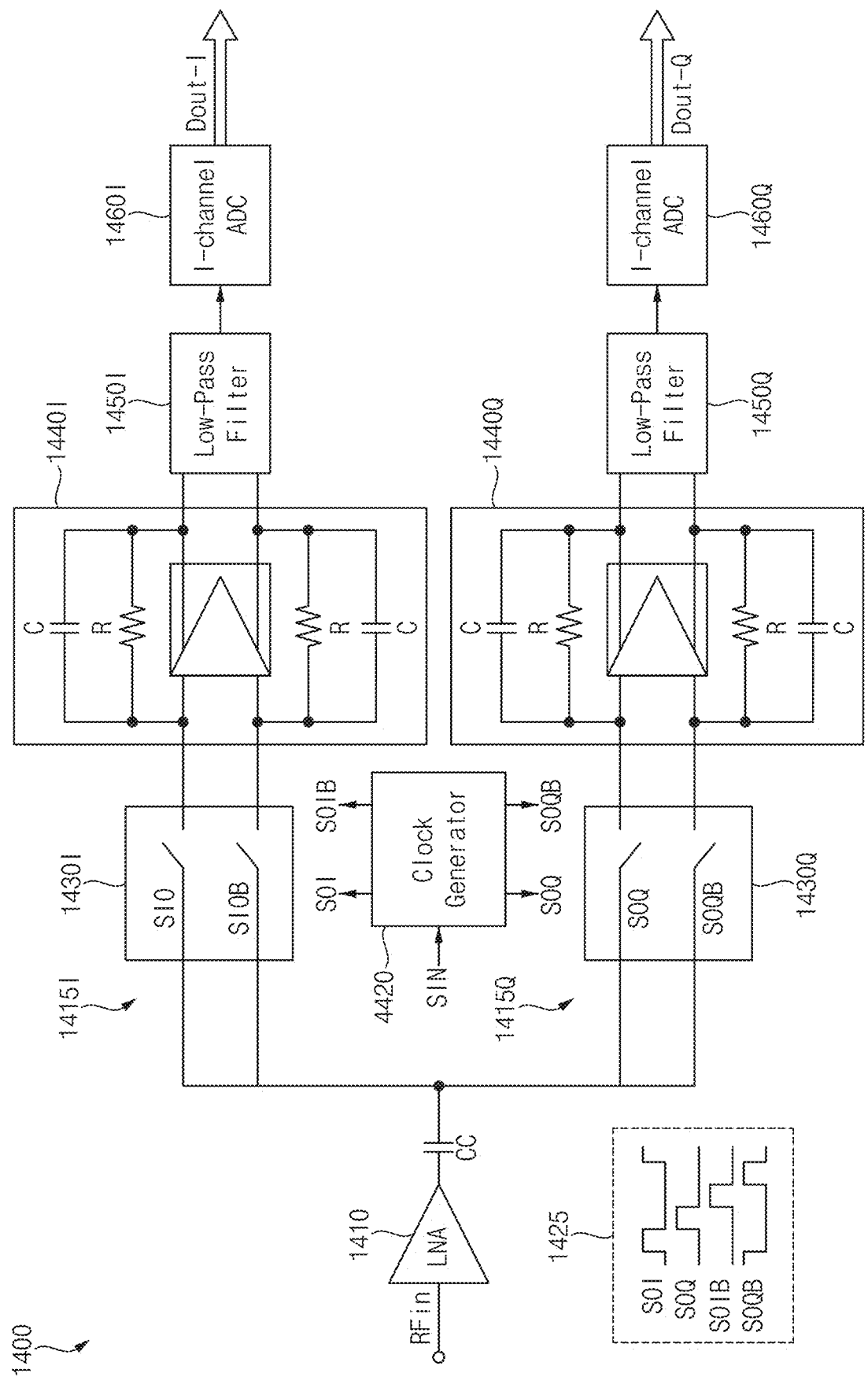
FIG. 23 is a diagram illustrating an example embodiment of an interface circuit included in a wireless communication device according to example embodiments.

FIG. 23 is a diagram illustrating an example embodiment of an interface circuit included in a wireless communication device according to example embodiments. FIG. 23 illustrates a high-level block diagram of a receiver portion of an interface circuit 1400. As shown in FIG. 23, a receiver 1400 may be any type of an integrated circuit that includes RF capabilities and may include a low noise amplifier (LNA) 1410 that receives a reception RF signal RFin. Although not shown in the drawings, for example, a reception RF signal RFin may be received using an off-chip antenna. The RF signal amplified in LNA 1410 is coupled through a coupling capacitor CC to signal processing paths 14151 and 1415Q comprising current-driven passive mixers 14301 and 1430Q formed by respective switches.

As shown in FIG. 23, the interface circuit 1400 may include a clock generator 4420. The clock generator 4420 may, based on the input clock signal SIN, generate a first quadrature clock signal SOI, a second quadrature clock signal SOQ, a third quadrature clock signal SOIB and a fourth quadrature clock signal SOQB having a phase difference of 90 degrees and a duty cycle of 25% as shown in the inset 1425. The switches of the current-driven passive mixers 14301 and 1430Q may be selectively turned on respectively responding to the first quadrature clock signal SOI, the second quadrature clock signal SOQ, the third quadrature clock signal SOIB, and the fourth quadrature clock signal SOQB.

As such, the passive mixers 14301 and 1430Q may down-convert the incoming RF signal to a low frequency signal, such as intermediate frequency (IF) or baseband (zero-IF). The down-converted current signals may be provided to transimpedance amplifiers 14401 and 1440Q to be converted into voltage signals. These voltage signals are provided to the low pass filters 14501 and 1450Q as gain control signals, and the signals passed through the low pass filters 14501 and 1450Q may be provided to the analog-to-digital converters 14601 and 1460Q. The digital signals Dout-I and Dout-Q may be in baseband and are provided to an internal device of a wireless communication device, such as a digital signal processor. All of the circuitry shown in FIG. 23 may be implemented on a single semiconductor die of an integrated circuit.

In the above, examples in which clock generators according to example embodiments applied to semiconductor memory devices and wireless communication devices have been described, but example embodiments are not limited thereto. The clock generators according to example embodiments may be usefully applied to any semiconductor device requiring a plurality of output clock signals SO or a plurality of quadrature clock signals having a uniform duty cycle smaller than 50%.

Figure 24:
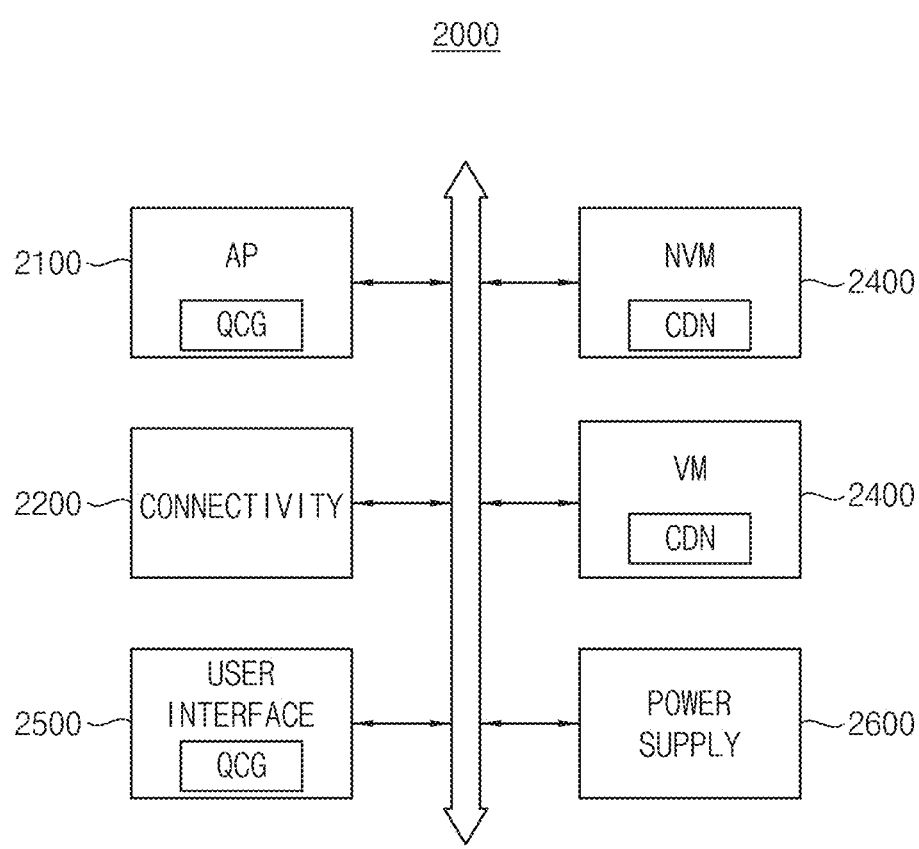
FIG. 24 is a block diagram illustrating a mobile system including a semiconductor memory device according to example embodiments.

FIG. 24 is a block diagram illustrating a mobile system including a semiconductor memory device according to example embodiments. Referring to FIG. 24, a mobile system 2000 may include an application processor (AP) 2100, a connectivity unit 2200, a volatile memory device (VM) 2300, a nonvolatile memory device (NVM) 2040, a user interface 2500, and a power supply 2600. In some embodiments, the mobile system 2000 may be, for example, a mobile phone, a smart phone, a personal digital assistant (PDA), a portable multimedia player (PMP), a digital camera, a music player, a portable game console, a navigation system, or another type of electronic device.

The application processor 2100 may execute applications, e.g., a web browser, a game application, a video player, and so on. The connectivity unit 2200 may perform wired or wireless communication with an external device. The volatile memory device 2300 may store data processed by the application processor 2100 or may operate as a working memory. The nonvolatile memory device 2400 may store a boot image for booting the mobile system 2000. The user interface 2500 may include at least one input device, such as a keypad, a touch screen, etc., and at least one output device, such as a speaker, a display device, etc. The power supply 2600 may supply a power supply voltage to the mobile system 1200.

At least some of the components shown in FIG. 24 may include a clock generator QCG and/or a clock distribution network CDN as described above. As described above, the clock generator according to example embodiments may filter noise of the input clock signal by the implementation based on a digital phase-locked loop, operate with low power by the operation in a state in which the frequency is lowered, and operate over a wide frequency range because it utilizes duty cycle comparison to correct quadrature errors.

In addition, a semiconductor memory device adopting a clock distribution network using a clock generator according to example embodiments may operate with low power consumption by transferring the input clock signal having a reduced frequency through a clock tree structure and generating the plurality of output clock signals from the clock generators. In addition, the clock generators included in the clock distribution network of the semiconductor memory device may be disposed immediately before the interface circuits that use the plurality of output clock signals having a duty cycle of 25% to reduce the quadrature errors and additional delay cells for quadrature error correction may be omitted. Accordingly, the performance of the semiconductor memory device may be improved by sufficiently securing a data sampling window of the interface circuit while significantly reducing the power consumption of the clock distribution network.

Embodiments described herein may be applied to a clock generator and any system requiring clock generator. For example, embodiments may be applied to systems, such as a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A clock generator, comprising:
a phase controller circuit configured to generate phase control information in response to comparing a phase of an input clock signal against a phase of a division clock signal;
an oscillator configured to generate a plurality of oscillation signals having an equivalent output frequency but different phases, in response to the phase control information and duty control information;
a duty cycle converter circuit configured to generate a plurality of output clock signals at the equivalent output frequency by adjusting duty cycles of the plurality of oscillation signals, such that the plurality of output clock signals have duty cycles smaller than the duty cycles of the plurality of oscillation signals;
a clock divider configured to generate the division clock signal by dividing one of the plurality of output clock signals, such that the division clock signal has a division frequency smaller than the equivalent output frequency; and
a duty cycle calibrator circuit configured to generate the duty control information for adjusting a duty cycle difference of the plurality of output clock signals, in response to detecting duty cycle differences between the plurality of output clock signals.

2. The clock generator of claim 1, wherein the duty cycle calibrator circuit is configured to convert values of the duty cycles of the plurality of output clock signals into direct current (DC) voltages, and generate the duty control information in response to comparing the DC voltages.

3. The clock generator of claim 2, wherein the oscillator is configured to adjust transition time points of the plurality of oscillation signals based on the duty control information, such that the duty cycles of the plurality of output clock signals become uniform.

4. The clock generator of claim 1, wherein the clock divider is configured to: (i) selectively operate in an active mode or an idle mode based on a mode signal, and (ii) generate the division clock signal, such that the division clock signal has a first division frequency in the active mode and has a second division frequency smaller than the first division frequency in the idle mode.

5. The clock generator of claim 1,
wherein the plurality of output clock signals include a first quadrature clock signal corresponding to the one of the plurality of output clock signals, a second quadrature clock signal that is 90° delayed in phase relative to the first quadrature clock signal, a third quadrature clock signal that is 90° delayed in phase relative to the second quadrature clock signal, and a fourth quadrature clock signal that is 90° delayed in phase relative to the third quadrature clock signal;
wherein the plurality of oscillation signals include a first oscillation signal having the same phase with the first quadrature clock signal, a second oscillation signal having the same phase with the second quadrature clock signal, a third oscillation signal having the same phase with the third quadrature clock signal, and a fourth oscillation signal having the same phase with the fourth quadrature clock signal;
wherein the first, second, third and fourth oscillation signals have 50% duty cycles; and
wherein the first quadrature clock signal, the second quadrature clock signal, the third quadrature clock signal, and the fourth quadrature clock signal have 25% duty cycles.

6. The clock generator of claim 5, wherein the duty cycle calibrator circuit is configured to: (i) provide a first duty control value that is fixed to a constant value, (ii) generate a second duty control value to decrease a duty cycle difference of the first quadrature clock signal and the second quadrature clock signal by comparing duty cycles of the first quadrature clock signal and the second quadrature clock signal, (iii) generate a third duty control value to decrease a duty cycle difference of the second quadrature clock signal and the third quadrature clock signal by comparing duty cycles of the second quadrature clock signal and the third quadrature clock signal, and (iv) generate a fourth duty control value to decrease a duty cycle difference of the third quadrature clock signal and the fourth quadrature clock signal by comparing duty cycles of the third quadrature clock signal and the fourth quadrature clock signal.

7. The clock generator of claim 6, wherein the oscillator is configured to adjust a time point of a rising edge of the first oscillation signal based on the first duty control value, adjust a time point of a rising edge of the second oscillation signal based on the second duty control value, adjust a time point of a rising edge of the third oscillation signal based on the third duty control value, and adjust a time point of a rising edge of the fourth oscillation signal based on the fourth duty control value.

8. The clock generator of claim 1, wherein the phase controller circuit includes a bang-bang phase detector and a digital loop filter, such that the phase controller circuit, the oscillator, the duty cycle converter circuit and the clock divider form a digital phase-locked loop.

9. The clock generator of claim 1, wherein the oscillator includes:
a first buffer electrically connected between a fourth node and a first node, to generate a first oscillation signal through the first node;

a second buffer electrically connected between the first node and a second node, to generate a second oscillation signal through the second node;

a third buffer electrically connected between the second node and a third node, to generate a third oscillation signal through the third node; and a fourth buffer electrically connected between the third node and the fourth node, to generate a fourth oscillation signal through the fourth node.

10. The clock generator of claim 9, wherein each of the first buffer, the second buffer, the third buffer and the fourth buffer includes: a variable capacitor, which is configured to adjust a delay amount of each of the first buffer, the second buffer, the third buffer and the fourth buffer, based on each of a first duty control value, a second duty control value, a third duty control value and a fourth duty control value.

11. The clock generator of claim 1, wherein the duty cycle calibrator circuit includes:

a multiplexing circuit configured to output a first multiplexer signal and a second multiplexer signal by selecting two output clock signals from among the plurality of output clock signals based on a selection signal;

a comparison circuit configured to convert a duty cycle of the first multiplexer signal to a first DC voltage, convert a duty cycle of the second multiplexer signal to a second DC voltage, and generate a comparison result signal by comparing the first DC voltage and the second DC voltage;

a plurality of control circuits configured to generate a plurality of duty control values included in the duty control information based on the comparison result signal; and a demultiplexer configured to provide the comparison result signal to one of the plurality of control circuits based on the selection signal.

12. The clock generator of claim 11, wherein the comparison circuit includes:

a first low pass filter configured to filter the first multiplexer signal to generate the first DC voltage;

a second low pass filter configured to filter the second multiplexer signal to generate the second DC voltage;

a pre-amplifier configured to amplify a difference between the first DC voltage and the second DC voltage to generate a first comparison voltage and a second comparison voltage; and a comparator configured to generate the comparison result signal by comparing the first comparison voltage and the second comparison voltage.

13. A clock signal generator, comprising:

an oscillator configured to generate a plurality of oscillation signals having an equivalent output frequency but different phases, in response to duty control information;

a duty cycle converter circuit configured to generate a plurality of output clock signals at the equivalent output frequency, in response to adjusting duty cycles of the plurality of oscillation signals, such that the plurality of output clock signals have duty cycles smaller than the duty cycles of the plurality of oscillation signals; and a duty cycle calibrator circuit configured to generate the duty control information for adjusting a duty cycle difference of the plurality of output clock signals, in response to detecting duty cycle differences between the plurality of output clock signals.

14. The clock signal generator of claim 13, wherein the duty cycle calibrator circuit is configured to convert values of the duty cycles of the plurality of output clock signals into direct current (DC) voltages, and generate the duty control information in response to comparing the DC voltages.

15. The clock signal generator of claim 14, wherein the oscillator is configured to adjust transition time points of the plurality of oscillation signals based on the duty control information, such that the duty cycles of the plurality of output clock signals become uniform.

* * * * *